US010692054B2

(12) United States Patent
Chow et al.

(10) Patent No.: US 10,692,054 B2
(45) Date of Patent: *Jun. 23, 2020

(54) DOCUMENT TRACKING ON DISTRIBUTED LEDGER

(71) Applicant: The Toronto-Dominion Bank, Toronto (CA)

(72) Inventors: Arthur Carroll Chow, Toronto (CA); Paul Mon-Wah Chan, Toronto (CA); Perry Aaron Jones Haldenby, Toronto (CA); John Jong Suk Lee, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,653

(22) Filed: Nov. 20, 2018

(65) Prior Publication Data

US 2019/0087792 A1    Mar. 21, 2019

Related U.S. Application Data

(63) Continuation of application No. 15/235,528, filed on Aug. 12, 2016, now Pat. No. 10,163,080.
(Continued)

(51) Int. Cl.
*G06F 21/16* (2013.01)
*G06F 21/64* (2013.01)
(Continued)

(52) U.S. Cl.
CPC ......... *G06Q 20/0655* (2013.01); *G06F 21/62* (2013.01); *G06F 21/645* (2013.01);
(Continued)

(58) Field of Classification Search
None
See application file for complete search history.

(56) References Cited

U.S. PATENT DOCUMENTS 6,820,199 B2   11/2004   Wheeler et al.
7,194,543 B2    3/2007   Corneille et al.
(Continued)

FOREIGN PATENT DOCUMENTS

EP         1693804        8/2016
WO    WO 2013/112642 A1   8/2013

OTHER PUBLICATIONS

Tezos—a self-amending crypto-ledger White paper. Goodman, L.M. (Year: 2014).*
(Continued)

*Primary Examiner* — Venkat Perungavoor
(74) *Attorney, Agent, or Firm* — Duane Morris LLP

(57) ABSTRACT

An apparatus for use in electronic document control includes a storage device a processor coupled to the storage device. The storage device storing software instructions for controlling the processor that when executed by the processor configure the processor to: receive a signal representing data including an original document, append a unique identifier to the original document to generate a modified document, generate a hash value of the modified document, and transmit the hash value corresponding to the modified document to an electronic distributed ledger.

20 Claims, 8 Drawing Sheets

Related U.S. Application Data

(60) Provisional application No. 62/204,768, filed on Aug. 13, 2015.

(51) Int. Cl.

| | | |
|---|---|---|
| *G06F 21/62* | (2013.01) | |
| *G06Q 20/06* | (2012.01) | |
| *H04N 5/913* | (2006.01) | |
| *G06Q 20/36* | (2012.01) | |
| *G06Q 10/06* | (2012.01) | |
| *G06Q 10/10* | (2012.01) | |
| *G06Q 50/08* | (2012.01) | |
| *G06Q 20/10* | (2012.01) | |
| *G06Q 20/40* | (2012.01) | |
| *H04L 9/08* | (2006.01) | |
| *G06Q 50/18* | (2012.01) | |
| *H04L 9/32* | (2006.01) | |
| *H04L 29/06* | (2006.01) | |
| *G06Q 10/08* | (2012.01) | |
| *G06Q 30/02* | (2012.01) | |
| *G06Q 40/00* | (2012.01) | |
| *G06Q 40/08* | (2012.01) | |
| *G06Q 20/38* | (2012.01) | |

(52) U.S. Cl.
CPC . *G06Q 10/0631* (2013.01); *G06Q 10/063114* (2013.01); *G06Q 10/08* (2013.01); *G06Q 10/103* (2013.01); *G06Q 10/1097* (2013.01); *G06Q 20/065* (2013.01); *G06Q 20/102* (2013.01); *G06Q 20/367* (2013.01); *G06Q 20/3829* (2013.01); *G06Q 20/401* (2013.01); *G06Q 20/405* (2013.01); *G06Q 20/4016* (2013.01); *G06Q 30/0214* (2013.01); *G06Q 40/08* (2013.01); *G06Q 40/128* (2013.12); *G06Q 50/08* (2013.01); *G06Q 50/18* (2013.01); *H04L 9/0816* (2013.01); *H04L 9/0861* (2013.01); *H04L 9/0891* (2013.01); *H04L 9/0894* (2013.01); *H04L 9/3247* (2013.01); *H04L 63/061* (2013.01); *H04L 63/062* (2013.01); *H04L 63/0876* (2013.01); *H04N 5/913* (2013.01); *G06Q 2220/00* (2013.01); *G06Q 2220/10* (2013.01); *G06Q 2230/00* (2013.01); *H04L 63/0435* (2013.01); *H04L 63/0442* (2013.01); *H04L 63/08* (2013.01); *H04L 63/12* (2013.01); *H04L 2209/24* (2013.01); *H04L 2209/38* (2013.01); *H04L 2209/56* (2013.01); *H04N 2005/91342* (2013.01); *Y02P 90/86* (2015.11); *Y04S 10/54* (2013.01)

(56) References Cited

U.S. PATENT DOCUMENTS

| | | |
|---|---|---|
| 7,324,976 B2 | 1/2008 | Gupta et al. |
| 7,818,256 B1 | 10/2010 | Ward |
| 8,150,769 B2 | 4/2012 | Gupta et al. |
| 8,695,089 B2* | 4/2014 | Liu ................... H04L 63/1458 713/189 |
| 2002/0111907 A1 | 8/2002 | Ling |
| 2002/0128917 A1 | 9/2002 | Grounds |
| 2003/0126079 A1 | 7/2003 | Roberson et al. |
| 2005/0024201 A1 | 2/2005 | Culpepper et al. |
| 2005/0063545 A1* | 3/2005 | Fujimoto ............... G06F 21/64 380/277 |
| 2005/0091173 A1 | 4/2005 | Alve |
| 2006/0242038 A1 | 10/2006 | Guidilli |
| 2007/0046689 A1 | 3/2007 | Tokimoto et al. |
| 2008/0168564 A1* | 7/2008 | Lerouge ................ G06F 21/64 726/26 |
| 2010/0263060 A1* | 10/2010 | Charbonneau ...... G06F 21/6218 726/30 |
| 2012/0293840 A1 | 11/2012 | Wilson |
| 2014/0005809 A1 | 1/2014 | Frei et al. |
| 2014/0112571 A1 | 4/2014 | Viera et al. |
| 2015/0120056 A1 | 4/2015 | Van Rooyen |
| 2015/0371548 A1 | 12/2015 | Samid |
| 2015/0379510 A1* | 12/2015 | Smith ................ G06Q 20/3829 705/71 |
| 2016/0065540 A1 | 3/2016 | Androulaki et al. |
| 2016/0162897 A1 | 6/2016 | Feeney |
| 2016/0260169 A1 | 9/2016 | Arnold et al. |
| 2016/0292680 A1 | 10/2016 | Wilson, Jr. et al. |
| 2016/0342989 A1 | 11/2016 | Davis |
| 2017/0177898 A1 | 6/2017 | Dillenberger |

OTHER PUBLICATIONS

A Blockchain-Based Approach to Health Information Exchange Networks. Peterson et al. (Year: 2012).*

A Next Generation Smart Contract and Decentralized Application Platform. Buterin, Vitalik. (Year: 2014).*

Ethereum: A Secure Decentrialised Generalised Transaction Ledger. Wood, Gavin. (Year: 2014).*

Araoz, "What is proof of existence?," retrieved from https://proofofexistence.com/about, 2016 (2 pages).

BTProof: Trusted Timestamping on the Bitcoin Blockchain, 2016 (2 pages).

"Open-source Internet of Things Micropayment Processing Hits the Market," Bitcointalk.org, Jul. 2015, retrieved from https://bitcointalk.org/index.php?topic=854280;imode on Sep. 30, 2016 (3 pages).

"How it Works," retrieved from https://toronto.car2go.com/how-it-works/ on Sep. 30, 2016 (8 pages).

Karame, G.O., et al., "Pay as you Browse: Microcomputations as Micropayments in Web-based Services," Proceedings of WWW 2011—Session: E-commerce, Mar. 28-Apr. 1, 2011, pp. 307-316.

Ectors, M., "Five new businesses for Telefonica Digital," Sep. 21, 2011, retrieved from https://telruptive.com/tag/micro-payment on Sep. 30, 2016 (1 page).

Dawson, R., "The new layer of the economy enabled by M2M payments in the Internet of Things," Sep. 16, 2014, retrieved from http://rossdawsonblog.com/weblog/archives/2014/09/new-layer-economy-enabled-m2m-payments-internet-things.html on Sep. 30, 2016 (7 pages).

Global eCoin Trade Clu-Ripple (XRP), SteveKorex Club. (2014).

* cited by examiner

DOCUMENT TRACKING ON DISTRIBUTED LEDGER

CROSS-REFERENCE TO RELATED APPLICATION

This application claims the benefit of priority to U.S. application Ser. No. 15/235,528, filed Aug. 12, 2016, which claims the benefit of priority to U.S. Provisional Application No. 62/204,768 filed Aug. 13, 2015. The disclosures of these applications are expressly incorporated by reference herein to their entireties.

BACKGROUND

Virtual and crypto-currencies, such as Bitcoin™, are gaining acceptance as viable mechanisms for performing purchase transactions and other financial services transactions. The transfer of units of these virtual and crypto-currencies between owners, which is essential to the ultimate success of these virtual and crypto-currencies, relies on a robust distributed ledger structure that, due to its public nature, redundant verification, and resistance to fraudulent activity, offers advantages over existing centralized server systems.

Despite its many advantages, conventional distributed ledger systems have several drawbacks, especially when used to track assets in secure, high-risk, and/or sensitive contexts.

SUMMARY

In some embodiments of the present disclosure, an apparatus for use in electronic document control is disclosed. The apparatus includes a storage device a processor coupled to the storage device. The storage device storing software instructions for controlling the processor that when executed by the processor configure the processor to: receive a signal representing data including an original document, append a unique identifier to the original document to generate a modified document, generate a hash value of the modified document, and transmit the hash value corresponding to the modified document to an electronic distributed ledger.

In some embodiments of the present disclosure, a method of document tracking and verification is disclosed. The method includes receiving a signal representing data including an original document. The original document is modified to include a unique image verification identifier. A hash value of the modified document is generated. The hash value corresponding to the modified document is transmitted to an electronic distributed ledger.

In some embodiments of the present disclosure, a method of verifying a document is disclosed. The method includes receiving, from a third party, an unverified document image. A distributed ledger maintained by a trusted authority is accessed. The distributed ledger includes one or more blocks each storing at least one verified document image. A hash value of the unverified document image is generated according to one or more rules stored in the distributed ledger. The hash value of the unverified document is compared to a hash value of the at least one verified document image stored by the distributed ledger. An authentication message is generated if the hash value of the unverified document image and the hash value of the verified document image are the same. A not-authenticated message is generated if the hash value of the unverified document image and the hash value of the verified document image are different.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

In some embodiments, systems and methods for storing, tracking, and authenticating one or more documents using a distributed ledger, such as a distributed ledger, is disclosed. The method includes generating a document image of an original document, modifying the document image using a unique identifier, and generating a hash of the modified document for storage and tracking by a distributed ledger. In some embodiments, the system is configured to verify authenticity of unverified document images of documents tracked by the distributed ledger. In some embodiments, the system is configured to track one or more changes to the documents tracked by the distributed ledger.

Figure 1:
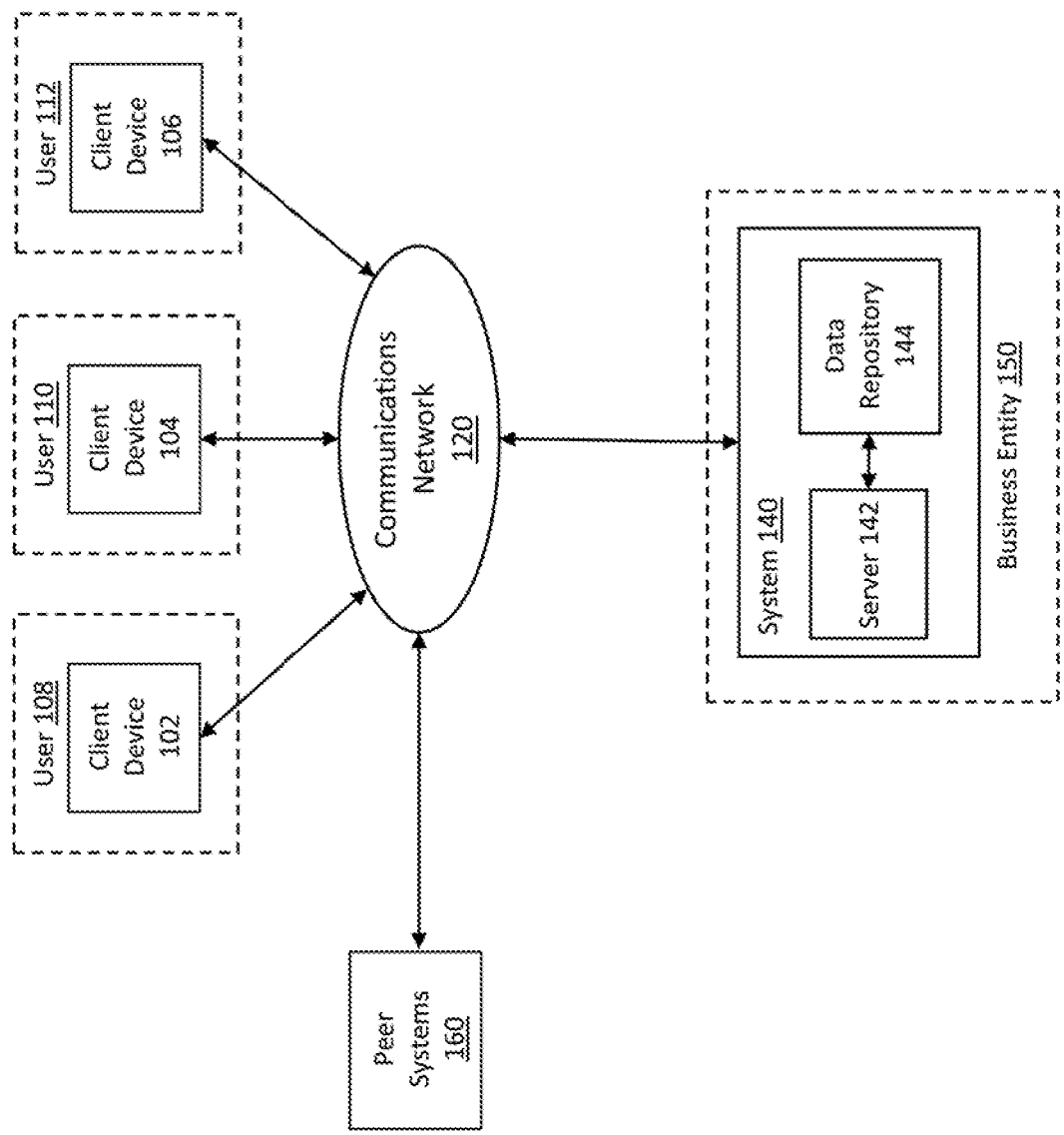
FIG. 1 is a diagram of a system in accordance with some embodiments of the present disclosure.

FIG. 1 is a block diagram of a system 100 in accordance with some embodiments of the present disclosure. System 100 may be a computing environment including client devices 102, 104, and 106, system 140, one or more peer systems 160, and a communications network 120 connecting various components of system 100. Although three client devices are shown in this example, any number of client devices may be present.

Various components of computing environment 100 are configured to address problems associated with conventional distributed ledgers by embedding a master encryption key architecture into a conventional distributed architecture (e.g., a distributed architecture associated with the public Bitcoin™ ledger). In various embodiments, the resulting hybrid public-private distributed architecture facilitates selective encryption of information by client devices 102, 104, and 106, system 140, and/or peer systems 160, thus providing a solution that protects sensitive and/or confidential instructions.

The conventional distributed architecture is described below with reference to FIG. 2, and then hybrid public-private distributed architectures configured to store and/or track document images in accordance with various embodiments are described.

Asset Tracking Using Conventional Distributed Ledgers

Figure 2:
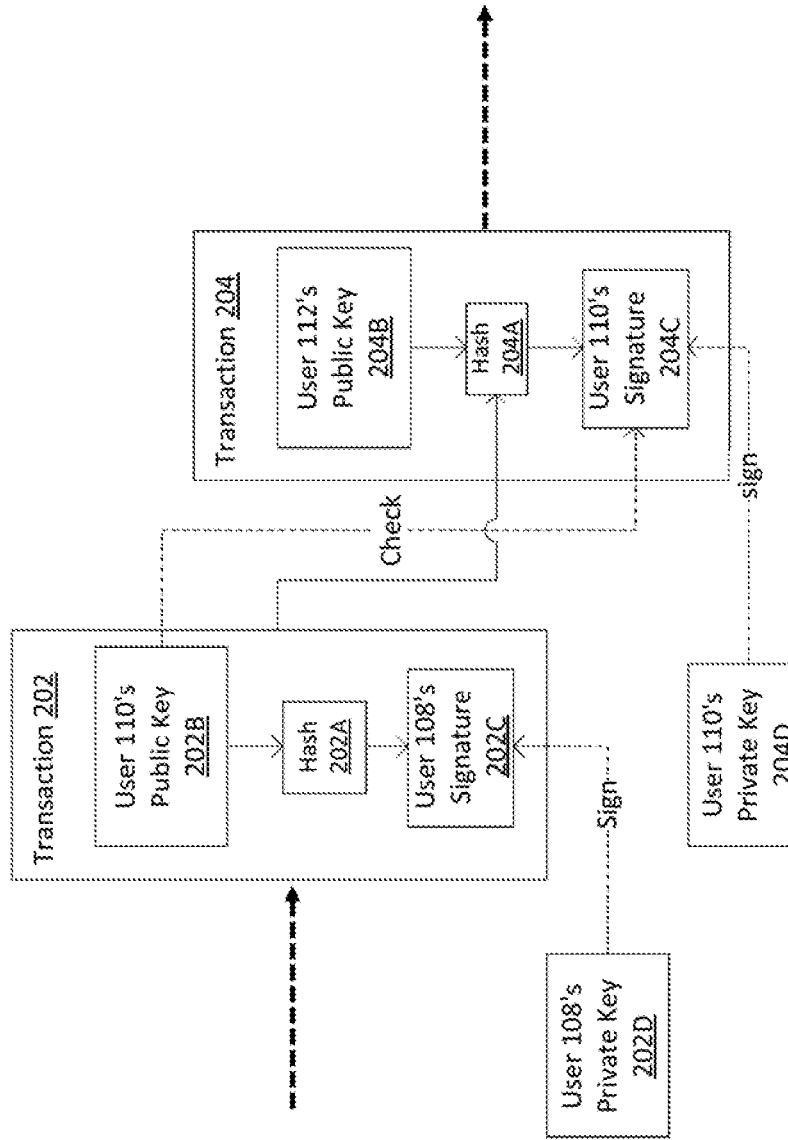
FIG. 2 is a diagram of a conventional distributed ledger architecture.

FIG. 2 is a diagram of a structure 200 of a conventional distributed ledger, which may be generated through the interaction of components of computing environment 100. In the example of FIG. 2, user 110 is associated with client device 104, which executes a stored software application (e.g., a wallet application) capable of obtaining a current version of a conventional distributed ledger from one or more networked computer systems (e.g., one of peer systems 160 configured to "mine" broadcasted transaction data and update ledgers). The current version of a conventional distributed ledger may represent a "longest" distributed ledger than includes a maximum number of discrete "blocks." The blocks identify respective transactions that transfer and/or distribute portions of tracked assets among various owners, including user 110.

FIG. 2 shows blocks corresponding to two transactions 202 and 204, with arrows to the left and right of these transactions indicating that these are merely two transactions in a potentially longer series of chained blocks (hence the term "distributed ledger"). In the first transaction (transaction 202) depicted in FIG. 2, user 108 transfers ownership of a portion of tracked assets (e.g., of some amount of a virtual currency or cryptocurrency) to user 110. In the second transaction (transaction 204), user 110 transfers ownership to user 112. In general, any number of transactions may be supported.

Client device 104 obtains the current distributed ledger and processes the distributed ledger to determine that a prior owner (user 108 in this example) transferred ownership of a portion of the tracked assets to user 110 in transaction 202. One or more peer systems 160 previously verified, processed, and packed data associated with transaction 202 into a corresponding block of the conventional distributed ledger.

Transaction 202 includes a cryptographic hash (e.g., hash 202A) of one or more prior transactions, and a public key of the recipient (e.g., public key 202B of user 110). The transaction data may also include a digital signature 202C of user 108 (the prior owner), which is applied to hash 202A and public key 202B using a private key 202D of user 108 through any of a number of techniques apparent to one of skill in the art. The presence of user 108's public key within transaction data included within the conventional distributed ledger facilitates verification of user 108's digital signature 202C by client device 104 and/or peer systems 160.

In the second transaction (transaction 204), user 110 transfers the tracked asset portion to user 112. For example, client device 104 may execute one or more software applications (e.g., wallet applications) that generate data specifying a transaction (e.g., transaction 204) transferring ownership of the tracked asset portion from user 110 to user 112, and further. The software application(s) transmit the generated data to one or more of peer systems 160 for verification, processing (e.g., additional cryptographic hashing) and inclusion into a new block of the distributed ledger.

For example, data specifying transaction 204 may include a cryptographic hash 204A of prior transaction 202, a quantity or number of units of the tracked asset portion that are subject to transfer in transaction 204, and a public key of the recipient (e.g., public key 204B of user 112). Further, in some aspects, the data specifying transaction 204 may include a digital signature 204C of the user 110, which may be applied to hash 204A and public key 204B using a private key 204D of user 110. Further, and by way of example, the presence of user 110's public key 202B within transaction data included within the conventional distributed ledger may enable various devices and systems (e.g., client devices 106, 106, and/or 108, peer systems 160, etc.) to verify user 110's digital signature 204C, as applied to data specifying transaction 204.

One or more of peer systems 160 may receive the data specifying transaction 204 from client device 104. In certain instances, peer systems 160 may act as "miners" for the distributed ledger, and may competitively process the received transaction data (either alone or in conjunction with other data) to generate additional blocks of the ledger, which may be appended to the distributed ledger and distributed across peer systems 160 (e.g., through a peer-to-peer network) and to other connected devices of environment 100.

Conventional distributed ledger architectures enable the public to review content of the ledgers and verify ownership details. The decentralized nature of conventional distributed ledgers enables multiple distributed networks to verify the contents of a single ledger. The resulting redundancy may render conventional distributed ledger architecture more robust than centralized server systems, and effectively eliminates the falsification of ledger data by malicious parties.

Despite these positive characteristics, conventional distributed ledger architectures have certain drawbacks when implemented by secured, high-risk systems. For example, unencrypted conventional ledger blocks may represent a security concern for transactions of sensitive nature and may represent a privacy concern for members of the general public. For instance, information indicative of an interaction of a prior asset owner and a corresponding device, as present within conventional distributed ledgers, may represent private information that should not be available to future owners, let alone members of the public.

Furthermore, if an owner loses his/her private key, the distributed nature of conventional distributed ledger architectures provides little or no opportunity to recover possession of the tracked asset(s). The rigidity and inflexibility of these conventional distributed ledger architectures, and their inability to adapt to changing circumstances (e.g., loss of private keys, theft of tracked assets due to fraudulent or malicious activity), often results in volatility in the usage of the tracked assets and an erosion in the public's trust of conventional distributed ledgers.

Further, current distributed ledgers fail to provide systems and methods for storing, tracking, verifying, and/or updating documents generated by one or more entities, such as deal documents, mortgage or other loan documents, business documents, identification documents, and/or any other suitable documents. The non-centralized nature of current ledgers can prevent confidence levels of business and/or individuals from reaching a level necessary to entrust the distributed ledger with sensitive business, personal, or other documents.

Various embodiments address the foregoing deficiencies of conventional distributed ledger architectures by providing security features suitable for use in high-risk, sensitive scenarios. Furthermore, various embodiments provide a framework that gives recourse to owners or holders of assets tracked by distributed ledger architectures in the event of fraud or malicious activity, while maintaining the public availability and verification characteristics of distributed ledgers.

Client Devices

Referring back to FIG. 1, each of client devices 102, 104, and 106 may include a computing device, such as a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device. At least one of client devices 102, 104, and 106 may be associated with one or more users, such as users 108, 110, and 112, as shown in FIG. 1. For example, user 110 operates client device 104 and causes it to perform one or more operations in accordance with various embodiments.

Each client device 102, 104, 106 includes one or more tangible, non-transitory memories that store data and/or software instructions, and one or more processors configured to execute software instructions. Client devices 102, 104, and 106 may include one or more display devices that display information to a user and one or more input devices (e.g., keypad, keyboard, touchscreen, voice activated control technologies, scanners, cameras, or any other type of known input device) to allow the user to input information to the client device.

In one aspect, each client device 102, 104, and 106 stores in memory one or more software applications that run on the client device and are executed by the one or more processors. In some instances, each client device stores software applications that, when executed by one or more processors, perform operations that establish communications with one or more of peer systems 160 (e.g., across network 120) and that obtain, from peer systems 160, a current version of a hybrid distributed ledger generated and maintained in accordance with various embodiments.

Each client device 102, 104, and 106 may execute the stored software application(s) to obtain data from the hybrid distributed ledger that includes data identifying one or more tracked assets, and/or a public key of one or more users. The executed software applications may cause client devices 102, 104, and 106 to extract, from one or more accessed transaction blocks of the distributed ledger, a copy of an encrypted and/or hashed ownership/rules portion of the transaction block(s) (e.g., including the identification of a holder of a master key) and/or a copy of an encrypted and/or hashed master data block (e.g., encrypted using the master key and including rules permitting preconfigured and/or permissible actions involving the tracked assets). Client devices 102, 104, and 106 may provide information associated with one or more actions or transactions involving the tracked assets (e.g., information identifying the actions or transaction, information identifying the assets, a public key, a digital signature, etc.) to peer systems 160, along with copies of document images and/or other information regarding a tracked document.

In some embodiments, the stored application(s) include a wallet application provided by business entity 150 (e.g., a mobile wallet application or an application executable on a desktop computer). The wallet application is capable of initiating transactions denominated in one or more currencies, including virtual currencies such as Bitcoin™.

Exemplary Computer Systems

System 140 may be a computing system configured to execute software instructions to perform one or more operations in accordance with various embodiments. In one aspect, system 140 is associated with a business entity 150 (e.g., a financial institution) that provides financial accounts, financial services transactions, and investment services to one or more users (e.g., customers of business entity 150). In some aspects, system 140 is a distributed system that includes computing components distributed across one or more networks, e.g., network 120.

In one aspect, system 140 includes computing components configured to store, maintain, and generate data and software instructions. For example, system 140 may include one or more servers (e.g., server 142) and tangible, non-transitory memory devices (e.g., data repository 144). Server 142 may include one or more computing devices configured to execute software instructions to perform one or more processes in accordance with various embodiments. In one example, server 142 is a computing device that executes software instructions to perform operations that provide information to at least one other component of computing environment 100.

In one embodiment, server 142 includes a computer (e.g., a personal computer, network computer, or mainframe computer) having one or more processors that are selectively activated or reconfigured by a computer program. In one aspect, server 142 (or other computing components of system 140) may be configured to provide one or more websites, digital portals, etc., that provide services consistent with business entity 150, such as a digital banking or investment portal. For instance, server 142 may be configured to provide information associated with a requested web page over communications network 120 to client device 104, which may render the received information and present content from the web page on a display device, e.g., a touchscreen display unit.

In other aspects, server 142 (or other computing components of system 140) may be configured to provide information to one or more application programs executed by client device 104, e.g., through a corresponding application programming interface (API). For example, client device 104 may execute an application program associated with and provided by business entity 150, such a mobile banking application and/or a mobile document tracking application, to provide services in accordance with various embodiments. In some instances, server 142 provides information to client devices 102, 104, and/or 106 (e.g., through the API associated with the executed application program), and client devices 102, 104, and/or 106 present portions of the information to corresponding users through a corresponding graphical user interface (GUI).

Server 142 (or other computing components of system 140) may be configured to provide to client devices 102, 104, and/or 106 (and/or receive from any of the client devices) information associated with services provided by business entity 150. For example, client device 104 may receive the transmitted information, and store portions of the information in locally accessible storage device and/or network-accessible storage devices and data repositories (e.g., cloud-based storage). In one instance, client device 104 executes stored instructions (e.g., an application program, a web browser, a mobile banking application, and/or a mobile wallet application) to process portions of the stored data and render portions of the stored data for presentation to user 110. Additionally, server 142 may be incorporated as a corresponding node in a distributed network or as a corresponding networked server in a cloud-computing environment. Furthermore, server 142 may communicate via network 120 with one or more additional servers (not shown), which may facilitate the distribution of processes for parallel execution by the additional servers.

In further aspects, business entity 150 may represent a "controlling entity" capable of regulating transactions assets (e.g., units of virtual currency, units of various financial instruments, physical assets, etc.) tracked within hybrid public-private ledgers in accordance with various embodiments. For example, one or more computing components of system 140 (e.g., server 142) may be configured (e.g., by executed software instructions) to establish one or more rules that regulate a distributions of and/or transactions associated with the tracked assets, an initiation of transfers of the tracked assets (e.g., a sale, a use of the tracked assets as collateral in a secured transaction etc.), and any other action involving the tracked assets and/or the hybrid public-private ledger (e.g., processes that generate additional cryptographic key sets for user 110, processes that recover assets tracked in the hybrid public-private ledger, etc.).

System 140 may establish causal relationships between one or more of the established rules and one or more events that trigger an initiation of one or more corresponding regulated distributions, transfers, and/or other actions involving assets tracked within the hybrid public-private ledger (e.g., "triggering events"). For example, a confirmed loss of a document master copy may represent a triggering event to verify a user's identity, generate a new master copy of the document from a tracked document image, and transmit the new master copy through secure, non-accessible processes (e.g., by mail), in accordance with one or more established rules.

In some aspects, system 140 is configured to establish one or more of the rules, and one or more of the causal relationships and triggering events, based on internal regulations associated with business entity 150. For example, the internal regulations associated with business entity 150 may specify that system 140 verify an identity of user 110 (e.g., based on various forms of multi-factor authentication data) and/or obtain specific elements of documentation prior to initiating the lost master copy protocol outlined above. In other aspects, system 140 may establish one or more of the rules and/or triggering events based on information received from user 110 (e.g., as input provided to a web page or other graphical user interface (GUI) presented by client device 104 and provided to system 140). For example, user 110 may specify, as input to the web page or GUI presented by client device 104, one or more individuals that would need to review and/or execute a tracked document upon completion of one or more tasks and/or in the event of user 110's accidental death. Various embodiments are, however, not limited to the exemplary triggering events and established rules described above, and in other aspects, various embodiments may be configured to generate any other user- and system-specified rules and triggering events consistent with the hybrid public-private ledger and appropriate to the tracked assets, user 110, and/or business entity 150 (acting as a centralized authority for the hybrid public-private ledger).

System 140 may be configured to store the one or more established rules (e.g., as a rules engine) and one or more of the established trigger events (e.g., as an event trigger list) within a portion of a local data repository (e.g., data repository 144). System 140 may be configured to store portions of the rules engine and/or event trigger list within a secure data repository accessible to system 140 across network 140 (e.g., cloud-based storage).

One or more computing components of system 140 (e.g., server 142) may be configured to generate pairs of public and private keys for user 110 (e.g., user 110's public/private key pair), and to provide the generated private key to user 110 through secure, non-accessible and/or out-of-band communications (e.g., by mail, etc.). In further embodiments, the one or more components of system 140 (e.g., server 142) may be configured to generate and maintain additional cryptographic keys that facilitate a generation and maintenance of portions of the hybrid public-private ledger. For instance, system 140 may be configured to generate a master key, which system 140 may leverage to encrypt the stored rules engine. System 140 may store copies of the generated master key in a portion of data repository 144 that is not accessible to user 110 (and any other users), thus maintaining a confidence of the generated master key.

System 140 may be configured to generate and maintain a private crypto key on behalf of user 110 (and users 108 and 112), which system 140 may leverage to encrypt the stored event trigger list, and which may be provided to user 110 (and/or to users 108, 112) through secure, non-accessible and/or out-of-band communications. System 140 may store copies of the private crypto keys in a portion of data repository 144.

In some embodiments, one or more computing components of system 140 (e.g., server 140) is configured to hash the generated (and encrypted) rules engine and event trigger list into a genesis block associated with the hybrid public-private ledger. System 140 may provide the encrypted rules engine and event triggers list to one or more of peer systems 160, which may be configured to hash the encrypted rules engine and event trigger list into the genesis block. By hashing the encrypted rules engine and event trigger list into the genesis block of the hybrid public-private ledger, various embodiments enable an in-band communication of the encrypted rules engine and event triggers from user to user within blocks (e.g., transactions) of the hybrid public-private ledger.

Exemplary Data Repositories and Stored Data

Data repository 144 may include one or more memories that are configured to store and provide access to data and/or software instructions. Such memories may include tangible non-transitory computer-readable media that store software instructions that, when executed by one or more processors (e.g., of server 132), perform one or more operations in accordance with various embodiments. Data repository 144 may also be configured to store information relating to business entity 150, e.g., a financial institution.

For instance, data repository 144 may store customer data that uniquely identifies customers of a financial institution associated with system 140. As one example, a customer of the financial institution (e.g., any of users 108, 110, and 112) may access a web page associated with system 140 (e.g., through a web server executed by a corresponding front end), and may register for digital banking services and provide data, which may be linked to corresponding ones of users 108, 110, and/or 112, and stored as customer data within data repository 144. The stored customer data may, for example, include personal information, government-issued identifiers, employment information, and contact information. The stored customer data may also include authentication credentials associated with registered users of the financial institution, e.g., a user name, a user-specified password, a system-generated password, an alphanumeric identification number (e.g., a PIN number) specified by the users or assigned by financial system 140, biometric information, and information facilitating enhanced authentication techniques.

Data repository 144 may store a rules engine identifying one or more rules that regulate tracking, viewing, verification, updating, and/or access to tracked document images, an initiation of one or more transactions involving the tracked assets (e.g., a sale, a transfer in ownership, a use of the tracked assets as collateral in a secured transaction etc.), and any other action involving the tracked assets and/or the hybrid public-private ledger (e.g., processes that generate additional cryptographic key sets for users 108, 110, and/or 112, processes that recover assets tracked in the hybrid public-private ledger, etc.). Data repository 144 may also store information identifying an event triggers list that identifies causal relationships established by system 140 between one or more of the established rules and one or more events that trigger an initiation of one or more corresponding regulated transactions of tracked document images within the hybrid distributed ledger (e.g., "triggering events").

Data repository 144 may also store a copy of a master key, private crypto keys associated with users 108, 110, and 112, and additional private crypto keys associated with other users. For example, system 140 may be configured to store the private crypto keys in a data structure that includes information that associates the private crypto keys with corresponding users 108, 110, and 112, and further, may be configured to store the master key in a data structure within data repository 144 that is inaccessible to users 108, 110, and/or 112 (and other users). Further, in some aspects, data repository 144 may be configured to store the rules engine and/or event triggers list in raw, unencrypted form. In other aspects, in accordance with various embodiments, data repository 144 may be configured to store the rules engine and/or event triggers in encrypted form (e.g., using the stored master key), and/or store a hashed representation of the rules engine and/or the event triggers list.

Exemplary Communications Networks

Communications network 120 may include one or more communication networks or media of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. In accordance with various embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols in accordance with various embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

Exemplary Peer Systems

Referring back to FIG. 1, peer systems 160 may include one or more computing systems configured to execute software instructions to perform one or more operations in accordance with various embodiments. In some aspects, peer systems 160 may include computing components configured to store, maintain, and generate data and software instructions. For example, each of peer systems 160 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In an embodiment, one or more of peer systems 160 may be configured to receive, from client device 104 across network 120, information associated with a transaction or other action associated with one or more tracked document images in accordance with various embodiments. For example, the received information may include, but is not limited to, a document image, data identifying a current owner of the document (e.g., user 110) (or a obfuscated owner identifier), and further, encrypted copies of and/or hash values representative of the rules engine and event triggers list.

In some aspects, one or more of peer systems 160 are configured (e.g., by the executed software programs) to validate the received information and to generate a new block of the hybrid distributed ledger that includes the received information, either alone (e.g., using a "one transaction, one block" paradigm) or in combination with information identifying additional distributions, transactions, or other actions associated with one or more tracked assets (e.g., as a multiple-transaction block). The one or more peer systems 160 may be further configured to generate one or more hashes representative of the new block, which may be appended to a prior version of the hybrid private-public ledger along with the newly generated block. In some aspects, the one or more peer systems 160 may maintain the updated versions of the hybrid private-public ledger (i.e., the latest, longest hybrid private-public ledger), and may provide the updated version of the hybrid private-public ledger to client devices 102, 104, and/or 106 (or other client devices associated with other users) upon receipt of a request across network 120 and/or at regular or predetermined intervals.

In certain instances, and in addition to a connection with network 120, peer systems 160 may be interconnected across a peer-to-peer network (not depicted in FIG. 1) using any of the wired or wireless communications protocols outlined above. Further, in some instances, one or more of peer systems 160 may function as a "miner," where any miner may be compensated in units of a virtual currency (e.g., Bitcoin™) for validating the received data and for generating updated versions of the hybrid distributed ledger.

Exemplary Processes for Tracking Assets Using Hybrid Private-Public Ledgers

In some embodiments, client devices 102, 104, and/or 106 may execute one or more stored applications that enable corresponding users to track, in conjunction with peer systems 150 and other components of computing environment 100, a disposition and distribution of one or more assets using conventional, publicly available and transparent distributed ledgers. In some aspects, the use of public distributed ledgers to track ownership, disposition, and distribution of actual and/or virtual assets (e.g., unit of virtual currencies, such as Bitcoin™, unit of other financial instruments and securities, physical documents, physical contracts, etc.) may present advantages over existing centralized server systems, such as those provided by financial institutions that leverage private ledgers.

Exemplary Hybrid Public-Private Distributed Ledger Architectures

Various embodiments address problems associated with conventional block-ledger architectures in a technical manner, by providing computer-implemented systems and methods that augment a conventional distributed ledger with a private-master encryption key architecture that, in conjunction with an owner's pair of public and private keys, selectively encrypt ledger data to protect both the privacy of owners of tracked assets and the confidentiality of existing instruction sets maintained within the distributed ledger.

By incorporating an encrypted rules engine and corresponding list of triggering events (e.g., an event triggers list) into each block of the conventional distributed ledger architecture (and thus generating a hybrid, public-private distributed architecture), computer-implemented systems and methods in accordance with various embodiments may perform operations that provide owners or holders tracked assets with recovery options in an event of fraud or malicious activity, while maintaining the public availability and verification characteristic of conventional distributed ledgers.

Discrete data blocks of the conventional distributed ledgers (e.g., as outlined above in reference to FIG. 2) and of the hybrid distributed ledgers (e.g., as described in reference to FIG. 3) may include common elements of data that may specify transactions that verify, update, and/or otherwise act upon tracked documents images. For example, these common data elements may include, but are not limited to, input data that references one or more prior versions (e.g., a cryptographic hash of the one or more prior versions of a document), output data that includes instructions for transferring the tracked document image to one or more additional owners, and a digital signature applied to the input and/or output data using a corresponding private key of a current owner of the tracked document image. Various embodiments are, however, not limited to the exemplary transactions described above, and in further embodiments, discrete blocks of the hybrid distributed ledgers may represent any other transaction and/or data appropriate to the tracked document images and to the transaction, such as registration and tracking of documents, for example, contracts, deeds, wills, insurance policies, and/or other documents.

In contrast to conventional distributed ledgers, various embodiments may establish a "centralized authority" capable of vetting real-time transactions (e.g., verifications, transfers, and/or other actions) involving tracked document images within the exemplary hybrid distributed ledger architectures described herein, and capable of establishing and maintaining rules (e.g., through a rules engine and corresponding list of triggering events) that facilitate regulatory-based, policy-based, and customer-specified controls of transactions involving the tracked assets (e.g., units of virtual currency, documents, etc.).

For example, business entity 150 may represent the centralized authority, and one or more computing components of system 150 may perform operations that establish the rules engine and the list of triggering events, which may be stored within a secure data repository (e.g., data repository 144). In some aspects, the generated and stored rules engine may identify one or more rules that regulate a verification of the tracked document images, an initiation of one or more transactions involving the tracked document images (e.g., a sale, a use of the tracked assets as collateral in a secured transaction etc.), and further, any other action involving the tracked assets and/or the hybrid public-private ledger. The generated and stored list of triggering events may include information that specifies causal relationships between one or more of the established rules and one or more events that trigger an initiation of one or more corresponding regulated distributions, transactions, and/or actions associated with assets tracked within the hybrid public-private ledger (e.g., the triggering events).

In further contrast to conventional distributed ledgers, one or more computing components of system 140 (e.g., server 142 upon execution of stored instructions) may generate additional cryptographic keys that facilitate the exemplary regulation of transactions (e.g., distributions, transfers, and/or actions) involving assets tracked within the hybrid public-private ledger. By way of example, system 140 may generate a master cryptographic key with which system 140 may encrypt the generated and stored rules engine. In some aspects, system 140 may store copies of the generated master key in a portion of data repository 144 that is not accessible to user 110 (and any other users), thus maintaining confidence in the generated master key.

System 140 may also perform operations that encrypt the generated list of triggering events, either alone or in conjunction with metadata identifying the centralized authority and/or information facilitating processing of the transaction blocks throughout the hybrid distributed ledger. System 140 may also perform operations that generate and maintain additional private cryptographic keys (e.g., a private "crypto" key) associated with each owner and associated with the assets tracked within the hybrid distributed ledger (e.g., users 108, 110, and/or 112). The private crypto keys enable the owners to decrypt and access the list of triggering events and the metadata identifying the centralized authority. System 140 may store copies of the generated private crypto keys in a portion of data repository 144. Furthermore, system 140 may also perform operations that provide corresponding ones of the private crypto keys to users 108, 110, and/or 112 through secure, inaccessible, and/or out-of-band communications.

Various embodiments may also be configured to communicate the encrypted and/or hashed rules engine and list of triggering events to owners of, and/or user associated with, the tracked assets through "in-band" communication processes, such as through an incorporation of the encrypted rules engine and list of triggering events into the transaction blocks of the hybrid distributed ledger. For example, system 140 may perform operations that hash the encrypted rules engine and list of triggering events into a genesis block of the hybrid distributed ledger, the contents of which may be incorporated (e.g., by client devices 102, 104, and/or 106, peer systems 160, etc.) into each of the subsequent transaction blocks generated and appended to the hybrid distributed ledger. In some aspects, by incorporating the hashed and encrypted rules engine and list of triggering events into blocks of the hybrid distributed ledger, various embodiments may ensure that the established rules are followed even in an event of actions by malicious parties to disrupt the tracked assets (e.g., instances of Bitcoin™ peeling, etc.)

The additional private crypto keys held by the owners and/or users (e.g., stored in corresponding ones of client devices 102, 104, and/or 106 and accessible to executable application programs) may enable the owners and/or users to access the encrypted list of triggering events maintained within the hybrid distributed ledger. The owners and/or user may, through corresponding client devices, view the individual events that, when detected by system 140, could cause system 140 to perform operations that recover, authorize, audit, and/or verify the transaction and/or ownership data included within the hybrid distributed ledger (e.g., associated with corresponding portions of the tracked assets).

One or more computing components of system 140 may perform operations that modify portions of the stored rules and/or list of triggering events, e.g., in response to changes in regulations and/or policies, in response to additional owner input, etc. In order to access and modify the generated rules engine (and/or the list of triggering events) maintained within the hybrid distributed ledger, system 140 may leverage the stored master cryptographic key to access and modify the hashed and encrypted rules engine. System 140 may encrypt and re-hash the modified rules engine and submit the encrypted and hashed modified rules engine to one or more of peer systems 160 for inclusion in a block of the hybrid distributed ledger. For example, one or more of peer systems 160 may incorporate the hashed and encrypted modified rules engine into the hybrid distributed ledger as a special transaction (e.g., a "0" value transaction), such that the hybrid distributed ledger tracks each change within the modified rules engine.

Figure 3:
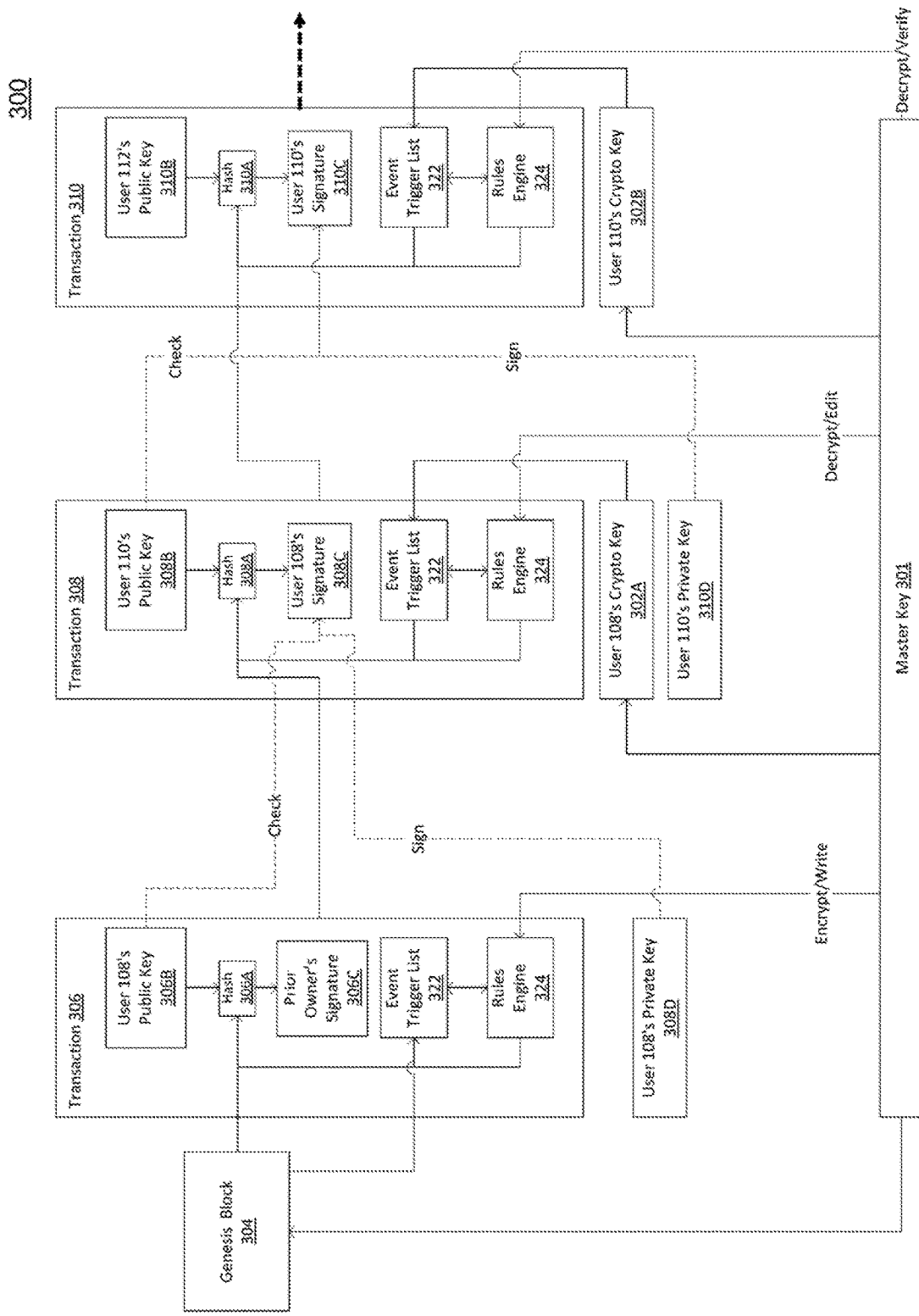
FIG. 3 is a diagram of a hybrid public-private distributed ledger architecture in accordance with some embodiments.

FIG. 3 is a schematic diagram illustrating an exemplary structure 300 of a hybrid, public-private distributed ledger, which may be generated through the interaction of components of computing environment 100 in accordance with various embodiments. For example, as described with reference to FIG. 3, users 108, 110, and 112 may be associated with corresponding devices (e.g., client devices 102, 104, and 106), which may be configured to execute one or more stored software applications (e.g., a wallet application) capable of obtaining a current version of a hybrid distributed ledger from one or more networked computer systems (e.g., one of peer systems 160 configured to "mine" broadcast transactions and update ledgers).

A system associated with a centralized authority (e.g., system 140 associated with business entity 150) may generate a rules engine that regulates transactions involving the assets tracked by the hybrid distributed ledger (e.g., distributions, transfers of ownership, other actions, etc.) and a list of triggering events that, upon detection by system 140, trigger an initiation of one or more of the distributions, transfers, and/or other actions regulated by the generated rules engine. System 140 may generate a master encryption key (e.g., master key 301 of FIG. 3), which may be maintained in a portion of data repository 144, and may generate additional private "crypto" keys 302A and 302B, which may be associated with corresponding ones of users 108 and 110. In some aspects, system 140 may maintain private crypto keys 302A, 302B, and 302C in a portion of data repository 144 and provide private crypto keys 302A, 302B, and 302C to users 108, 110, and 112 through secure, out-of-band communications. System 140 may encrypt the generated rules engine and the generated list of triggering events, and may perform operations that hash the encrypted rules engine and list of triggering events into a genesis block of the hybrid distributed ledger (e.g., genesis block 304).

One of the users (e.g., user 108) may own and/or control a portion of the tracked assets. For example, a device associated with user 108 (e.g., client device 102) may execute a stored software application (e.g., a wallet application) capable of obtaining a current version of a hybrid distributed ledger, including genesis block 304, from one or more networked computer systems (e.g., one of peer systems 160 configured to "mine" broadcast transactions and update ledgers). The current version of a hybrid distributed ledger may represent a "longest" distributed ledger than includes a maximum number of discrete "blocks," which may identify transactions that transfer, distribute, etc., portions of tracked assets among various owners, including user 108.

For example, client device 102 may obtain the current hybrid distributed ledger and process the hybrid distributed ledger to determine that a prior owner transferred ownership of a portion of the tracked assets to user 108 in a corresponding transaction (e.g., transaction 306, schematically illustrated in FIG. 3). One or more of peer systems 160 may have previously verified, processed, and packed data associated with transaction 306, which may be in a corresponding block of the distributed ledger.

As illustrated in FIG. 3, data specifying transaction 306 may include input data that references one or more prior transactions (e.g., transactions that transferred ownership of the tracked asset portion to the prior owner), and further, output data that includes instructions for transferring the tracked asset portion to user 108. For example, input data in accordance with various embodiments may include a cryptographic hash of the one or more prior transactions (e.g., hash 306A), and output data in accordance with various embodiments may include a quantity or number of units of the tracked asset portion that are subject to transfer in transaction 302 and a public key 306B of user 108 (i.e., the recipient of the tracked asset portion transferred in transaction 306). Further, in some aspects, the transaction data may include a digital signature 306C of the prior owner, which may be applied to hash 306A and public key 306B using a private key of the prior owner through any of a number of techniques apparent to one of skill in the art and appropriate to the distributed ledger architecture.

Further, and in contrast to the conventional distributed ledger architectures described above, transaction 306 may also include encrypted and/or hashed copies of rules engine 320 and trigger event list 322. A device of the prior owner (e.g., which may execute one or more software applications) may access genesis block 304 (e.g., from the current version of the hybrid distributed ledger obtained from one or more of peer systems 160), may parse genesis block 304, and may extract copies of the encrypted and/or hashed rules engine 324 and trigger event list 322. The prior owner's device may transmit to one or more of peer systems 160 the hash 306A, public key 306B, and digital signature 306C for verification, processing (e.g., additional cryptographic hashing) and inclusion into a new block of the hybrid distributed ledger. In an embodiment, user 108 may elect to further transfer that tracked asset portion to an additional user (e.g., user 110). For example, the one or more software applications executed by client device 102 may cause client device 102 to perform operations that generate input and output data specifying a new transaction (e.g., transaction 308 of FIG. 3) that transfers ownership of the tracked asset portion from user 108 to user 110, and further, that transmit the generated data to one or more of peer systems 160 for verification, processing (e.g., additional cryptographic hashing) and inclusion into a new block of the hybrid distributed ledger.

For example, data specifying transaction 308 may include a cryptographic hash 308A of prior transaction 306, a quantity or number of units of the tracked asset portion that are subject to transfer in transaction 308, and a public key of the recipient (e.g., public key 308B of user 110). The data specifying transaction 308 may include a digital signature 308C of the user 108, which may be applied to hash 308A and public key 308B using a private key 308D of user 108. The presence of user 108's public key within transaction data included within the conventional distributed ledger may enable various devices and systems (e.g., client devices 102, 104, and/or 106, peer systems 160, etc.) to verify user 108's digital signature 308C, as applied to data specifying transaction 308.

Client device 102 may also parse data specifying prior transaction 306 (e.g., as obtained from the current version of the hybrid distributed ledger) and extract encrypted and/or hashed copies of rules engine 324 and trigger event list 322. Client device 102 may append the encrypted and/or hashed copies of rules engine 324 and trigger event list 322 to the data specifying transaction 308 (e.g., cryptographic hash 308A, public key 308B, and digital signature 308C), and transmit the data specifying transaction 308B to one or more of peer systems 160 for verification, processing (e.g., additional cryptographic hashing) and inclusion into a new block of the hybrid distributed ledger.

Private crypto key 302A may enable client device 102 (e.g., associated with user 108) to access encrypted event trigger list 322 upon extraction from the hybrid distributed ledger. In some embodiments, private crypto key 302A provides client device 102 with read-only access to the encrypted event trigger list 322. Client device 102 may obtain private crypto key 302A from system 140 using secured out-of-band communications or as input provided by user 108 through a web page or other graphical user interface (GUI) presented by client device 104.

Ownership of the tracked asset portion may be transferred from user 108 to user 110 upon verification and publication of the data specifying transaction 308 within a corresponding block of the hybrid distributed ledger by peer systems 160. User 110 may elect to further transfer that tracked asset portion to yet another user (e.g., user 112). For example, the one or more software applications executed by client device 104 may cause client device 104 to perform operations that generate input and output data specifying a new transaction (e.g., transaction 310 of FIG. 3) that transfers ownership of the tracked asset portion from user 110 to user 112, and that transmit the generated data to one or more of peer systems 160 for verification, processing (e.g., additional cryptographic hashing) and inclusion into a new block of the hybrid distributed ledger.

Data specifying transaction 310 may include a cryptographic hash 310A of prior transaction 308, a quantity or number of units of the tracked asset portion that are subject to transfer in transaction 310, and a public key 310B of user 112. The data specifying transaction 310 may include a digital signature 310C of the user 110, which may be applied to hash 310A and public key 310B using a private key 310D of user 110. The presence of user 110's public key 308B within transaction data included within the hybrid distributed ledger may enable various devices and systems (e.g., client devices 102, 104, and/or 106, peer systems 160, etc.) to verify user 110's digital signature 310C, as applied to data specifying transaction 310.

Client device 104 may also parse data specifying prior transaction 308 (e.g., as obtained from the current version of the hybrid distributed ledger) and extract encrypted and/or hashed copies of rules engine 324 and trigger event list 322. Client device 104 may append the encrypted and/or hashed copies of rules engine 324 and trigger event list 322 to the data specifying transaction 310 (e.g., cryptographic hash 310A, public key 310B, and digital signature 310C), and transmit the data specifying transaction 310 to one or more of peer systems 160 for verification, processing (e.g., additional cryptographic hashing) and inclusion into a new block of the hybrid distributed ledger. Ownership of the tracked asset portion may be transferred from user 110 to user 112 upon verification and publication of the data specifying transaction 310 within a corresponding block of the hybrid distributed ledger by peer systems 160.

Private crypto key 302B may enable client device 104 (e.g., associated with user 110) to decrypt event trigger list 322 upon extraction from the hybrid distributed ledger. Client device 104 may obtain private crypto key 302B from system 140 using secured out-of-band communications, and additionally or alternatively, as input provided by user 110 through a web page or other graphical user interface (GUI) presented by client device 104. Client device 104 may identify and extract private crypto key 302B from a portion of the hybrid distributed ledger obtained from peer systems 160 (e.g., as a secure in-band communication).

In the embodiments described above, system 140 may establish and maintain rules (e.g., through a rules engine and corresponding list of triggering events) that facilitate regulatory-based, policy-based, and/or customer-specified controls of transactions involving assets tracked within a hybrid distributed ledger. For example, client devices 102, 104, and/or 106 may generate transaction data that includes a rules engine and list of triggering events, and one or more of peer systems 160 may embed the generated transaction data into blocks of the hybrid distributed ledger for reference in subsequent transactions. System 140 may be configured to detect an occurrence of an event (e.g., based on data received from client devices 102, 104, and/or 106, etc.), may determine whether the list of triggering events includes the detected event, and when triggering event list includes the detected event, perform one or more operations consistent with an established rule that references the detected event, as described below with reference to FIG. 4.

Figure 4:
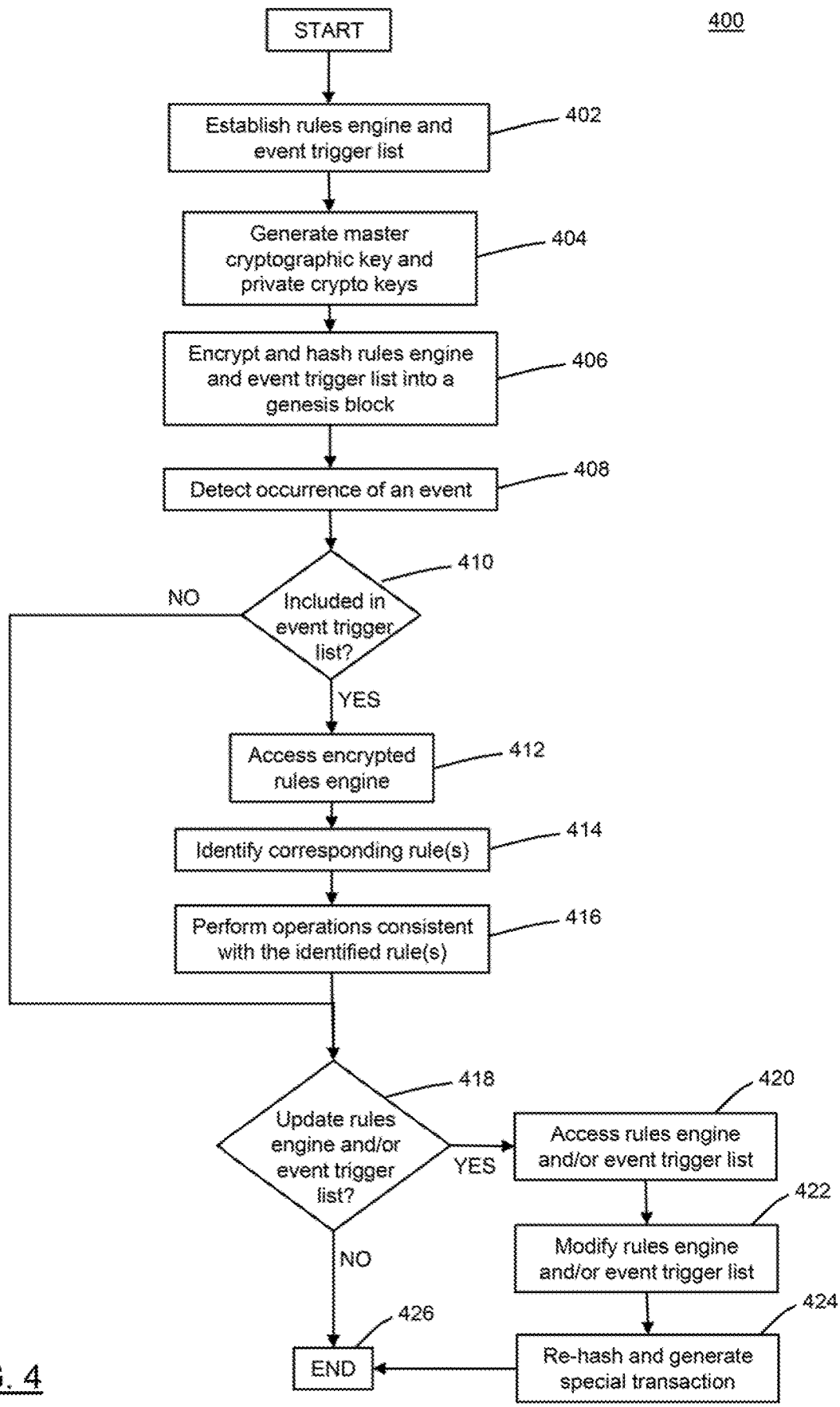
FIG. 4 is a flowchart of a process for performing event-based operations on assets tracked within a hybrid distributed ledger in accordance with some embodiments.

FIG. 4 is a flowchart of a process 400 for automatically performing event-based operations on assets tracked within a hybrid distributed ledger in accordance with some embodiments. In an embodiment, a centralized authority may be assigned to establish regulatory-based, policy-based, and/or customer-specified control over assets tracked within the hybrid distributed ledger. In some aspects, tracked assets in accordance with various embodiments may include units of a virtual currency or a crypto-currency, units of financial instruments held by one or more owners, physical assets utilized by one or more individuals and/or entities, and/or documents maintained by one or more individuals and/or entities. In some aspects, a computer system associated with the centralized authority (e.g., system 140 associated with business entity 150) may execute one more stored application programs to cause system 140 to recover, authorize, audit, and/or verify an ownership of at least a portion of the tracked assets and/or transactions involving the tracked assets based on established and maintained rules.

One or more computing components of system 140 may generate cryptographic keys that facilitate the exemplary regulation of transactions (e.g., distributions, transfers, and/or actions) involving assets tracked within the hybrid public-private ledger (e.g., in step 404). For example, in step 402, system 140 generates a master cryptographic key with which system 140 may encrypt the generated and stored rules engine. In some aspects, certain aspects, system 140 may store copies of the generated master key in a portion of data repository 144 that is not accessible to user 110 (and any other users), thus maintaining confidence in the generated master key.

In step 402, system 140 may also perform operations that generate and maintain additional private cryptographic keys (e.g., private "crypto" keys) associated with each user who may be an owner of the assets tracked within the hybrid distributed ledger. The generated private crypto keys may enable a device of each user to decrypt and access the list of triggering events and additionally or alternatively, metadata identifying the centralized authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

One or more computing components of system 140 may generate a rules engine and a list of triggering events, which may be stored within a portion of data repository 144 (e.g., in step 404). For example, the generated and stored rules engine may identify or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.). The generated and stored list of triggering events may include information that specifies causal relationships between one or more of the established rules and one or more events that trigger an initiation of one or more corresponding regulated distributions, transfers, and/or actions involving assets tracked within the hybrid public-private ledger (e.g., the triggering events).

System 140 may establish, in step 404, one or more of the rules and/or triggering events to reflect regulations and/or policies promulgated by governmental entity, a financial regulator, and/or the centralized authority. For example, system 140 may establish a loss of a private key by user 110 as a "triggering event" that would cause system 140 to perform operations that generate a new pair of public and private keys for user 110 in response to a verification of particular authentication credentials. System 140 may deem a documented theft of a portion of the tracked assets a "triggering event" that would cause system 140 to perform operations to recover the stolen portion of the tracked assets and generate a new pair of public and private keys for user 110.

System 140 may establish, in step 404, one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, etc.) in response to an accident that may occur in the future involving user 110 and/or user 110's death (e.g., triggering events). Various embodiments are, however, not limited to these exemplary triggering events and corresponding rules, and in further embodiments, system 140 may establish any additional or alternate rules and/or triggering events appropriate to the tracked assets, to business entity 150, and further, to users 108, 110, and 112.

In step 406, system 140 may perform operations that encrypt the generated and stored rules engine (e.g., using the master encryption key) and further, that encrypt the generated and stored list of triggering events (e.g., using any technique that facilitates decryption using the private crypto keys). For example, system 140 may perform operations in step 406 that hash the encrypted rules engine and list of triggering events into a genesis block of the hybrid distributed ledger, the contents of which may be incorporated (e.g., by client devices 102, 104, and/or 106, peer systems 160, etc.) into each of the subsequent transaction blocks generated and appended to the hybrid distributed ledger. By incorporating the hashed and encrypted rules engine and list of triggering events into the blocks of the hybrid distributed ledger, various embodiments may ensure that the established rules are followed even in an event of actions by malicious parties that disrupt the tracked assets (e.g., instances of Bitcoin™ peeling, etc.).

In some embodiments, one or more computing components of system 140 may detect an occurrence of an event involving a portion of the tracked assets, an owner of a portion of the tracked assets, and/or a transaction involving a portion of the detected assets (e.g., in step 408). For example, system 140 may receive data from client device 104 that indicates user 110 lost a corresponding private key associated with a portion of the tracked assets. In other instances, system 140 may detect an event in step 140 based on data received across network 120 from one or more systems associated with local, state, and/or federal governmental entities (e.g., data from a law enforcement system notifying business entity 150 of a theft of a portion of the tracked assets, data from a local government confirming a death of an owner of a portion of the tracked assets, etc.). In additional instances, system 140 may detect an occurrence of an event based on one or more sensors and devices communicatively connected to network 120 and capable of transmitting data to system 140. Various embodiments are, however, not limited to these exemplary events, and in further embodiments, system 140 may be configured to detect any additional or alternate event appropriate to the tracked assets and to the components of computing environment 100.

System 140 may also be configured to access the stored list of triggering events (e.g., within database 144), and may determine whether the list of triggering events includes the detected event (e.g., in step 410). If system 140 identifies the detected event as being within the list of triggering events (e.g., step 410; YES), system 140 may establish the detected event as a triggering event, and may access the encrypted rules engine using the master encryption key (e.g., in step 412). System 140 may further identify, within the accessed rules engine, one or more of the established rules that are causally related to the detected triggering event (e.g., in step 414). Further, system 140 may be configured to perform one or more operations, either individually or in sequence, that are consistent with the identified rules (e.g., in step 416). For example, the accessed rules engine may include information identifying the one or more operations associated with the identified rules. In other instances, at least one of the performed operations may represent a default operation associated with the identified rules (e.g., a specific type of authentication required before performing the one or more operations on behalf of user 110).

In one embodiment, one or more computing components of system 140 may also determine whether to update portions of the generated rules engine and/or list of triggering events (e.g., in step 418). For example, system 140 may identify an update or modification to one or more regulations and/or policies promulgated by governmental entity, a financial regulator, and/or the centralized authority. In other instances, system 140 may obtain, from client device 104, information updating a rule and/or triggering event previously established by system 140 based on input received from user 110 (e.g., through a web page and/or GUI presented by client device 104).

If system 140 determines to update portions of the generated rules engine and/or list of triggering events (e.g., step 418; YES), system 140 may access appropriate portions of the rules engine and/or list or triggering events in step 420 (e.g., using the master encryption key), and may modify the appropriate portions of the rules engine and/or list of triggering events to reflect the updated regulations, policies, user-specified rules, and/or user-specified events (e.g., in step 422). In some instances, system 140 may modify the accessed rules engine by adding a new rule, deleting an existing rule, modifying one or more parameters of an existing rule, and/or modifying one or more operations associated with an existing rule. In other instances, system 140 may modify the accessed list of event triggers to add a new triggering event, delete an existing triggering event, and/or add or modify parameters associated with an existing triggering event.

System 140 may encrypt and re-hash the modified rules engine and/or list of triggering events, and may submit the encrypted and hashed modified rules engine and/or list of triggering events to one or more of peer systems 160 for inclusion in a block of the hybrid distributed ledger (e.g., in step 424). For example, one or more of peer systems 160 may incorporate the hashed and encrypted modified rules engine and/or list of triggering events into the hybrid distributed ledger as a special transaction (e.g., a "0" value transaction), such that the hybrid distributed ledger tracks each change within the modified rules engine and/or list of triggering events. Exemplary process 400 is then complete in step 426.

Referring back to step 418, if system 140 determines that no modification to the rules engine and/or the list of triggering events is warranted (e.g., step 418; NO), exemplary process 400 may proceed to step 426, and exemplary process 400 is complete. Further, and in reference to step 410, if system 140 determines that the list of triggering events does not include the detected event (e.g., step 410; NO), exemplary process 400 may proceed to step 418, and system 140 may determine whether to update portions of the rules engine and/or list of triggering events using any of the exemplary processes described above.

In the embodiments described above, and through the generation of the master cryptographic key and management of the generated rules engine and corresponding list of triggering events, system 140 may perform operations that recover, authorize, audit, and/or verify an ownership of at least a portion of the tracked assets and/or transactions involving the tracked assets. The operations performed by system 140, which utilize hybrid distributed ledgers in accordance with various embodiments, would not be possible using the conventional distributed ledgers described above.

For example, user 110 may be a user of a document distributed ledger (e.g., Bitcoin™) and may store a private key (e.g., private key 310D) on a laptop computer (e.g., client device 104) to generate and confirm document transactions. In one instance, user 110 may unfortunately drop the laptop into a swimming pool while confirming a document transaction with private key 310D, and upon retrieval from the swimming pool, user 110 may establish that the laptop no longer functions and that data on the laptop is not recoverable.

Traditionally, through a device in communication with network 120 (e.g., user 110's smartphone), user 110 may access a conventional distributed ledger, such as those conventional architectures outlined above, and determine that the document transaction was incomplete when user 110 dropped the laptop into the swimming pool. Further, user 110 may determine that the document transaction represents an orphaned block within the conventional distributed ledger, and the documents associated with the orphaned block are unrecoverable and permanently lost.

In some embodiments, user 110 may access a hybrid distributed ledger (e.g., as described with reference to FIG. 3), and may determine that the document transaction was incomplete when user 110 dropped the laptop into the swimming pool. In some embodiments, however, user 110 may provide input to the smartphone identifying the unrecoverable private key, which the smartphone may transmit to system 140 across network 120. In some aspects, system 140 may receive the transmitted message (e.g., in step 408), may determine that user 110's loss of private key 310D represents a triggering event (e.g., step 410; YES), and may perform operations that authenticate user 110's identity and that regenerate a pair of private and public keys for user 110, which system 140 may transmit to user 110 through any of the secure non-accessible processes outlined above (e.g., in steps 412, 414, and 416). Upon receipt of the newly generated private key, user 110 may access the hybrid distributed ledger (e.g., through the smartphone) and confirm the document transaction to recover the document.

Further, and by way of example, user 110 may access a wallet application executed by client device 104, and further, may determine that the mobile wallet is missing a number Bitcoins™. User 110 may suspect that the loss of the Bitcoins™ represents a theft by a malicious entity, and through a complex search of a corresponding distributed ledger (e.g., conventional distributed ledgers described above, and/or hybrid distributed ledgers in accordance with various embodiments), user 110 may trace the theft of the Bitcoins™ to a single transaction within a corresponding block. User 110 may contact the police and report the theft, and the police may confirm the accuracy of user 110's allegations regarding the theft.

User 110 may, in some instances, be capable of processing the conventional distributed ledgers described above to determine an address of the malicious entity responsible for the theft. The decentralized and anonymous nature of conventional distributed ledgers may, however, prevent user 110 from identifying the malicious entity, and the stolen Bitcoins™ may remain permanently unrecoverable.

Various embodiments may, however, address the deficiencies of conventional distributed ledgers and provide user 110 with recourse to recover the stolen Bitcoins™. For example, the police may notify the centralized authority of the theft of user 110's Bitcoins™ and provide a destination address associated with the malicious entity (e.g., through a message transmitted to system 140 and received, e.g., in step 408). System 140 may determine that the theft of the Bitcoins™ represents a triggering event included within the generated list (e.g., step 410; YES), and may perform operations that automatically create a request for a new transaction that returns the stolen Bitcoins™ to user 110 using any of the exemplary techniques described above (e.g., in steps 412, 414, and 416). System 140 may also perform operations that regenerate a pair of private and public keys for user 110, which system 140 may transmit to user 110 through any of the secure non-accessible processes outlined above (e.g., in steps 412, 414, and 416).

The hybrid distributed ledger architectures described above may add a level of sophistication to conventional mechanisms for trustless communication by allowing transactions involving tracked assets to occur according to common transaction rules. Further, the hybrid distributed ledger architectures in accordance with various embodiments may allow owners of the tracked assets to project authority over the tracked assets by establishing customized rules for transaction authorization. Furthermore, and in contrast to conventional techniques described above, the hybrid distributed ledger architecture may enable a centralized authority (e.g., business entity 150 associated with system 140) to recover, authorize, audit, and/or verify an ownership of at least a portion of the tracked assets and/or transactions involving the tracked assets based on established and maintained rules.

In various embodiments, through the generation of a master cryptographic key and management of a generated rules engine and corresponding list of triggering events, system 140, acting as a centralized authority, may perform operations that recover, authorize, audit, and/or verify an ownership of at least a portion of the tracked assets and/or transactions involving the tracked assets. In some aspects, and as outlined above, tracked assets in accordance with various embodiments may include units of a virtual currency or a crypto-currency, units of financial instruments held by one or more owners, physical assets utilized by one or more individuals and/or entities, and/or documents such as contracts, deeds, wills, insurance policies, and/or other documents.

In additional aspects, the exemplary hybrid distributed algorithms described above may track a location, performance, usage, and/or status of one or more additional client devices (referred to as "connected devices") disposed within computing environment 100 (not shown in FIG. 1), which may be configured to establish communications with client devices 102, 104, and 106, and further, with system 140, using any of the communications protocols outlined above. For example, client devices 102, 104, and 106, system 140, and the connected devices may be uniquely identifiable and addressable within communications network 120, and may be capable of transmitting and/or receiving data across the established communications sessions. System 140 may be configured to establish the communications sessions with one or more of the connected devices, and to exchange data with the connected devices autonomously and without input or intervention from a user of client device 104 (e.g., user 110).

In some aspects, the connected devices may be implemented as a processor-based and or computer-based device that includes one or more processors and tangible, computer-readable memories. For example, connected devices in accordance with various embodiments may include mobile communications devices (e.g., mobile telephones, smart phones, tablet computers, etc.) and other devices capable of communicating with client device 104 (e.g., internet-ready televisions, internet-ready appliances and lighting fixtures, computing devices disposed within motor vehicles, etc.).

The connected devices may include sensor devices in communication with the one or more processors and the memories. The sensor devices may be configured to monitor the usage, location, status, etc., of corresponding ones of the connected devices, and may be configured to provide sensor data to corresponding ones of the processors. In some aspects, the sensor data may include data identifying a current state, data specifying intended and/or unintended interaction with one or more of users 108, 110, and/or 112 (e.g., through client devices 102, 104, and/or 106), inadvertent interactions (e.g., drops, other accidental interactions, etc.), and data describing any additional or alternate characteristics of the connected devices capable of being monitored and quantified by the sensor devices.

Computing environment 100 may include one or more additional computing systems in communication with the connected devices using any of the communications protocols outlined above. In some embodiments, the additional computing system include one or more sensor devices capable of monitoring a location, performance, usage, and/or status of the connected devices, which may establish a "sensor network" capable of monitoring the connected devices. These additional computing systems may provide the additional sensor data to the connected devices using any of the communications protocols outlined above, either a regular intervals or in response to requests from the connected devices. In some instances, the additional computing systems may be implemented as processor-based and/or computer-based systems consistent with the exemplary systems described above.

Figure 5:
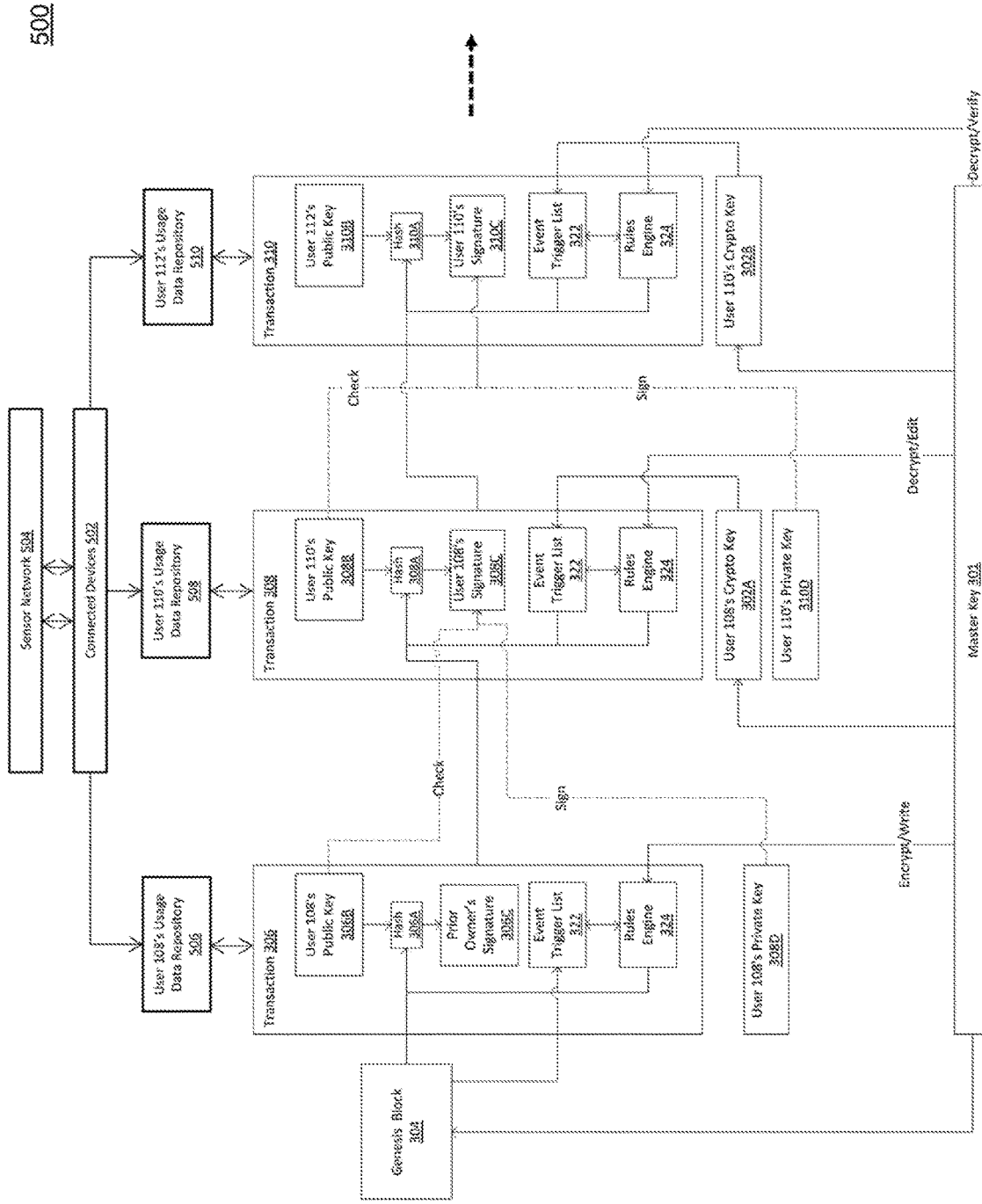
FIG. 5 is a flowchart of a process of storing a document image on a hybrid distributed ledger in accordance with some embodiments.

The connected devices may be configured to transmit portions of the sensor data (e.g., as detected by on-board sensor devices and/or received from the sensor network) to client devices 102, 104, and/or 106 and additionally or alternatively, to system 140, using any of the communications protocols outlined above. For example, the sensor data may characterize an interaction between the connected devices and users 108, 110, and 112 (e.g., the monitored data may represent usage data indicative of a consumption of one or more services provided by the connected devices), and the connected devices may transmit the usage data for users 108, 110, and/or 112 to corresponding ones of client devices 102, 104, and/or 106, which may store the received usage data in a corresponding data repository. The connected devices may also transmit the usage data to system 140, along with information linking specific elements of the usage data to corresponding users and/or client devices (e.g., user 110's usage data may be linked to an identifier of user 110 and/or of client device 104). As described below in reference to FIGS. 4 and 5, client devices 102, 104, and/or 108 may also incorporate corresponding portions of the monitored data, e.g., as received from the connected devices, into hybrid distributed ledgers in accordance with various embodiments in order to record, track, and publicly monitor the location, performance, usage, and/or status of the connected devices.

Document Tracking Using Hybrid Distributed Ledgers

Processes that maintain deeds and other important documents are crucial for proper record keeping and accessibility. Records are maintained in a secure, accessible repository and available to prove ownership or an occurrence of an event in a case of conflicting documentation. For example, a document may be hashed into a hybrid distributed ledger using a secure, known technique. In some embodiments, an image (e.g., from a camera, a scanner, a digital generated image, and/or any other source) of the document is hashed. The hashed document may also be used in the case of transactions, and an ownership chain may be maintained. Using hybrid distributed ledgers may enable financial institutions and other entities that provide loans secured against any of these deeds to automatically execute liens in the case of default on the loan. Further, the use of secured images may also provide further security, especially in a case of conflicting documentation.

Figure 6:
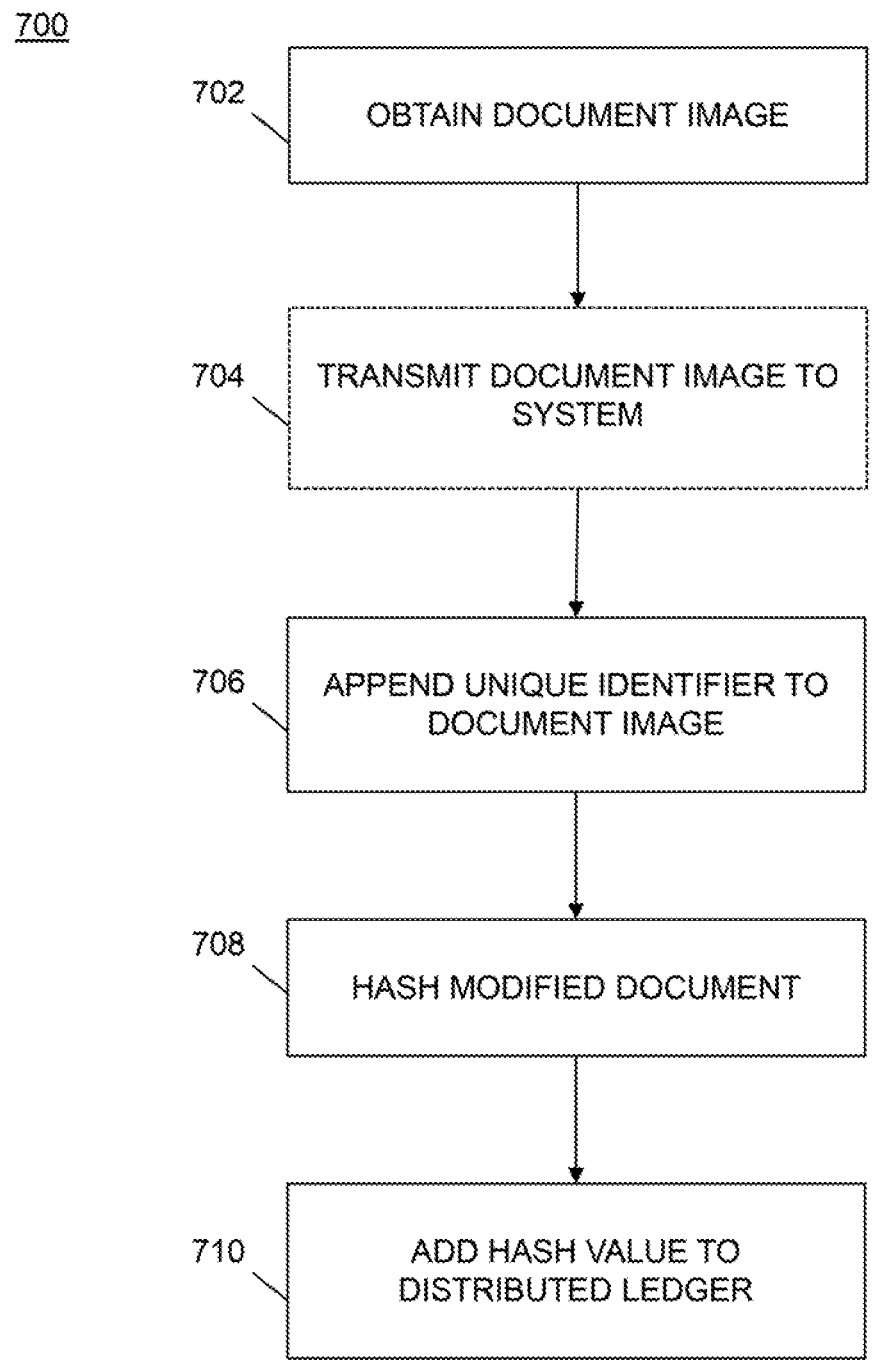
FIG. 6 illustrates one embodiment of a method for adding a document image to a distributed ledger-based tracking system, such as a hybrid distributed ledger, in accordance with some embodiments.

FIG. 6 illustrates one embodiment of a method 700 for adding a document image to a distributed ledger-based tracking system, such as a hybrid distributed ledger. At step 702 an image of the document is obtained by a client device 102, 104, 106. The one or more client devices 102, 104, 106 can be associated with a user 108, 110, 112. In some embodiments, the user 108, 110, 112 can be associated with the document, such as, for example, an executor of the document, a benefactor of the document, a signatory of the document, and/or any other relation to the document. In other embodiments, the user 108, 110, 112 is an employee of entity entrusted with tracking and/or verification of the document, such as a bank, escrow agent, and/or any other suitable entity. The client device 102, 104, 106 can obtain the document image by generating the image through one or more input means (such as a camera, scanner, etc.) formed integrally with the client device 102, 104, 106, by using a peripheral device (e.g., camera, scanner, etc.) attached to the client device 102, 104, 106, by retrieving a document image from a storage device, and/or can receiving a document image from one or more remote systems. The document image obtained by the client device 102, 104, 106 is referred to herein as an original document. It will be appreciated that the original document can be any suitable format including human and/or machine-readable formats. At an optional step 704, the original document is transmitted to the system 140. Although the additional steps are discussed as being performed by the system 140, it will be appreciated that any of the steps in the method 700 can be performed by one or more of the client devices 102, 104, 106, the system 140, the peers 160, a remote system (not shown), and/or any combination thereof, and are within the scope of this disclosure.

At step 706, a unique identifier is appended to the original document to generate a modified document. The unique identifier can be generated by any suitable method, such as, for example, a randomly generated unique identifier, a system-generated unique identifier, and/or any other suitable method. In some embodiments, the unique identifier is generated as a document authentication identifier (DAI) according to one or more known methods. The DAI can be generated by a central authority 150, the owner/generator of the document, and/or any other suitable entity. In some embodiments, the unique identifier can be added to the document image by directly injecting additional code into the document image file. For example, in some embodiments, the document image file includes a header having a field configured to receive a unique identifier therein. In other embodiments, the unique identifier is appended to the end of the document image file. The unique identifier can have a fixed and/or a variable length.

In some embodiments, the document image can be further processed at step 706. In some embodiments, the system 140 modifies the original document and/or the modified document according to one or more known image verification functions. For example, in some embodiments, a watermark, coloration, and/or other alteration to the document image is performed. In other embodiments, the document image file is modified according to one or more known image verification functions. For example, in various embodiments, one or more image modification functions and/or image transforms can include a Hough transform, a Radon transform, a discrete transform, a discrete cosine transform, a discrete Fourier transform, a wavelet transform, any combination thereof, and/or any other suitable known image transform and/or image modification function.

At step 708, a hash of the modified document is generated. The hash can be generated by providing the modified document to any suitable hashing function, such as, for example, a hash function associated with the hybrid distributed ledger, a hash function selected by an owner/issuer of the document, and/or any other suitable hash function. The hash function generates a unique (or semi-unique) hash value based on the modified document. For example, in some embodiments, the hash value generated for the modified document is different than a hash value that would be generated for the original document by the same hash function (due to the addition of the unique identifier). In some embodiments, the hash value of the modified document is passed through one or more additional hash functions to further hash/encrypt the document image.

In some embodiments, the hash function utilizes at least one of a public key and/or a private key associated with one or more clients 102, 104, 106 and/or a central authority 150. For example, in some embodiments, the hash function includes a digital signature 202 of a client 102, 104, 106. In some embodiments, the hash function includes a public and/or private key of one or more clients associated with the original and/or modified document, such as, for example, a public key of a signatory to the document, a private key an issuing entity of the document, a public key of a guarantor of the document, and/or any other suitable public or private key. The public and/or private key included in the hash function can be a key issued by a central authority 150 that maintains/manages the distributed ledger. For example, in some embodiments, the central authority 150 generates a unique public/private key combination for each entity that utilizes a hybrid distributed ledger to track document images. In other embodiments, the public/private cryptographic key is selected by a user 108, 110, 112.

At step 710, the hash value of the modified document is transmitted to one or more peers 160 for inclusion in a distributed ledger, such as, for example, a hybrid distributed ledger as described above. In some embodiments, the hash value is incorporated into the electronic distributed ledger as an additional block appended to the existing block chain. The hash value of the modified document may be incorporated with additional information regarding the document, such as, for example, data identifying signatory parties, issuing parties, guarantors of the document, ownership interest in the document, parties deriving a benefit from the document, parties having an obligation imposed in the document, and/or any other suitable information regarding the document. In some embodiments, the document image itself is stored on the distributed ledger as part of the generated block. In other embodiments, multiple hash values of related and/or unrelated documents can be stored in each block of the distributed ledger. One or more trusted peers 160 can generate additional blocks when a certain number of new document images and/or transactions related to the document images (as discussed below) are ready for processing.

After adding the document image to the distributed ledger, a user 108, 110, 112 can track the document image and utilize the original document image for verification of document copies presented by one or more third parties (as described in more detail below). In some embodiments, the distributed ledger can further track one or more aspects of the document/document image, through one or more transactions recorded in the distributed ledger. For example, in some embodiments, the distributed ledger can track one or more aspects of a document such as ownership interest, a controlling entity identifier, a security interest in the document, rights and responsibilities under the document, execution/expiration dates of the document, and/or any other suitable aspects of the document.

In some embodiments, one or more updates to the original document can be tracked by the distributed ledger. For example, in some embodiments, one or more documents, such as a contract, loan agreement, memorandum of understanding, deal document, etc., can have one or more terms updated due to change in status of the parties, government regulation, renegotiation, etc. In some embodiments, the updated document is processed and added to the distributed ledger according to the method 700 illustrated in FIG. 7. In some embodiments, the unique identifier appended to the updated document is the hash value of the original document and/or the modified document. In other embodiments, the changes to the document are recorded as transactions on the distributed ledger. For example, in some embodiments, updates to one or more terms of the original document can be recorded as transactions, as described above with respect to the hybrid distributed ledger.

Figure 7:
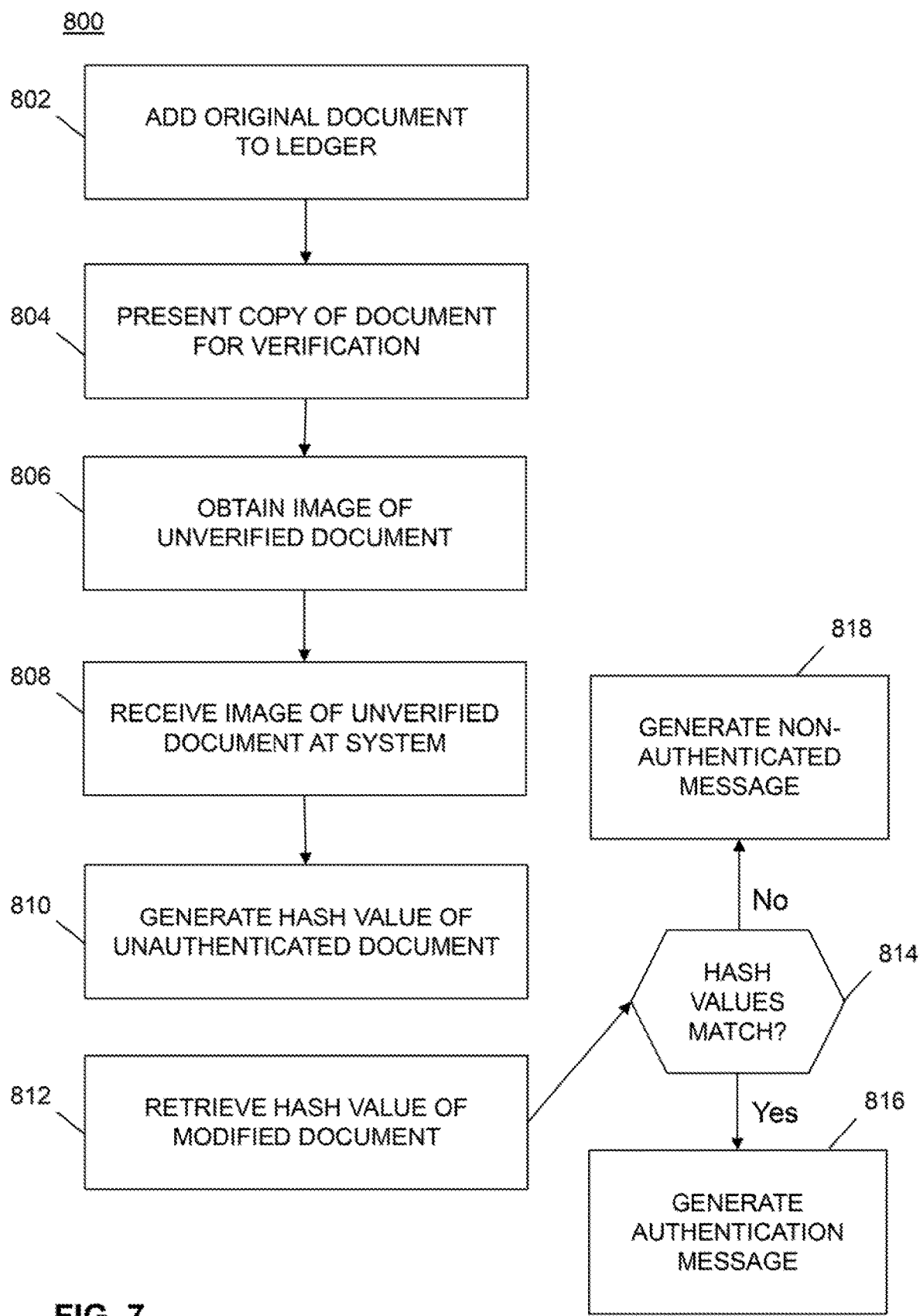
FIG. 7 is a flow chart illustrating a method of document version tracking and verification in a distributed ledger, in accordance with some embodiments.

In some embodiments, one or more copies of the original document can be verified by the system 140. FIG. 7 is a flow chart illustrating a method 800 of document version tracking and verification in a distributed ledger. At step 802, an original document is added to the distributed ledger according to the method 700 discussed in conjunction with FIG. 6. At step 804, an unverified copy of the original document is provided by a user 108, 110, 112 for verification. For example, in some embodiments, the document is a financial document provided to a financial institution for satisfaction. The financial institution can verify the authenticity of the document prior to execution thereof. As another example, the document is a will or other document that is executed by an event. An entity charged with execution of the document, such as an executor, can verify the authenticity of a document prior to execution thereof. Although specific embodiments are provided herein, it will be appreciated that any suitable document can be tracked and verified according to the method 800 and is within the scope of this disclosure.

At step 806, a verifying entity, such as, for example, a financial institution, escrow entity, executor, attorney, etc., obtains a document image of the unverified copy, referred to herein as the unverified document image. The unverified document image can be generated through one or more input means (such as a camera, scanner, etc.) formed integrally with the client device 102, 104, 106, by using a peripheral device (e.g., camera, scanner, etc.) attached to the client device 102, 104, 106, by retrieving a document image from a storage device, and/or can receive a document image from one or more remote systems.

At step 808, the system 140 receives the unverified document image. The unverified document image can be provided from a client device 102, 104, 106 associated with the verifying party. In some embodiments, the unverified document image can be encrypted and/or otherwise processed prior to transmission to the system 140. For example, in some embodiments, the unverified document image is provided via a secure, encrypted connection to prevent tampering with and/or alteration of the unverified document image during transmission from the verifying party to the central authority 150.

At step 810, the system 140 generates a hash value of the unverified document image. The hash value of the unverified document image is generated using the same unique identifier and hash function(s) used to generate the hash value of the original document. For example, in some embodiments, if the unique identifier for the original document was assigned by a central authority 150 and/or third party, the same unique identified is appended to the unverified document image prior to hashing. In other embodiments, if the unique identifier is generated according to one or more functions, the same functions can be used to generate a unique identifier for the unverified document image. The unique identifier is appended to the unauthenticated document and a hash of the unauthenticated document is generated using the same hash function(s) used to generate the hash of the original document.

At step 812, the system 140 retrieves the hash value of the original document from the distributed ledger. In some embodiments, the system 140 retrieves the hash value by obtaining a current copy of the distributed ledger and traversing the ledger until the block containing the hash value of the original document is found. The system 140 unpacks the hash value from the block. In other embodiments, the system 140 can maintain a searchable database of document images and/or hashes stored on the distributed ledger and can retrieve the document hash value from the searchable database. The searchable database can be maintained by the central authority 150 and/or a third-party.

At step 814, the system 140 compares the hash value of the original document retrieved from the distributed ledger with the hash value generated for the unverified document image. If the hash values match, the unverified document image is a true and correct copy of the original document and can be authenticated as a genuine copy of the original document. If the hash values do not match, the unauthenticated document includes one or more discrepancies with respect to the original document and is not verified as a genuine copy. For example, in various embodiments, failure to match the hash functions may indicate that one or more terms in the unverified document image do not match one or more terms in the original document, the signatures in the unverified document image may not match the signatures in the original document, and/or one or more other discrepancies between the unverified document image and the original document.

If the hash values match and the unauthenticated document is authenticated, at step 816, the system 140 generates an authentication message that is transmitted to the verifying party 108, 110, 112. The authentication message verifies the authenticity of the unverified document image. In some embodiments, the authentication message can include additional information regarding the original document, such as, for example, ownership interests in the document, parties to the document, etc. Authentication of the unverified document allows a verifying party to execute the document, provide a security interest in the document, and/or otherwise utilize the unverified document with confidence that the unverified document is a true representation of the original document.

If the hash values do not match, at step 818, the system 140 generates a not-authenticated message that is transmitted to the verifying party 108, 110, 112. The not-authenticated message indicates that the unverified document image could not be authenticated due to one or more issues. In some embodiments, the not-authenticated message may include additional information regarding the issues and/or discrepancies in the unverified document image. The verifying party 108, 110, 112 that generated the authentication request can perform one or more additional authentication attempts if they believe the not-authentication message to be in error, such as, for example, generating a new unverified document image for authentication, performing a hard-copy authentication, and/or otherwise authenticating the unverified document.

Figure 8:
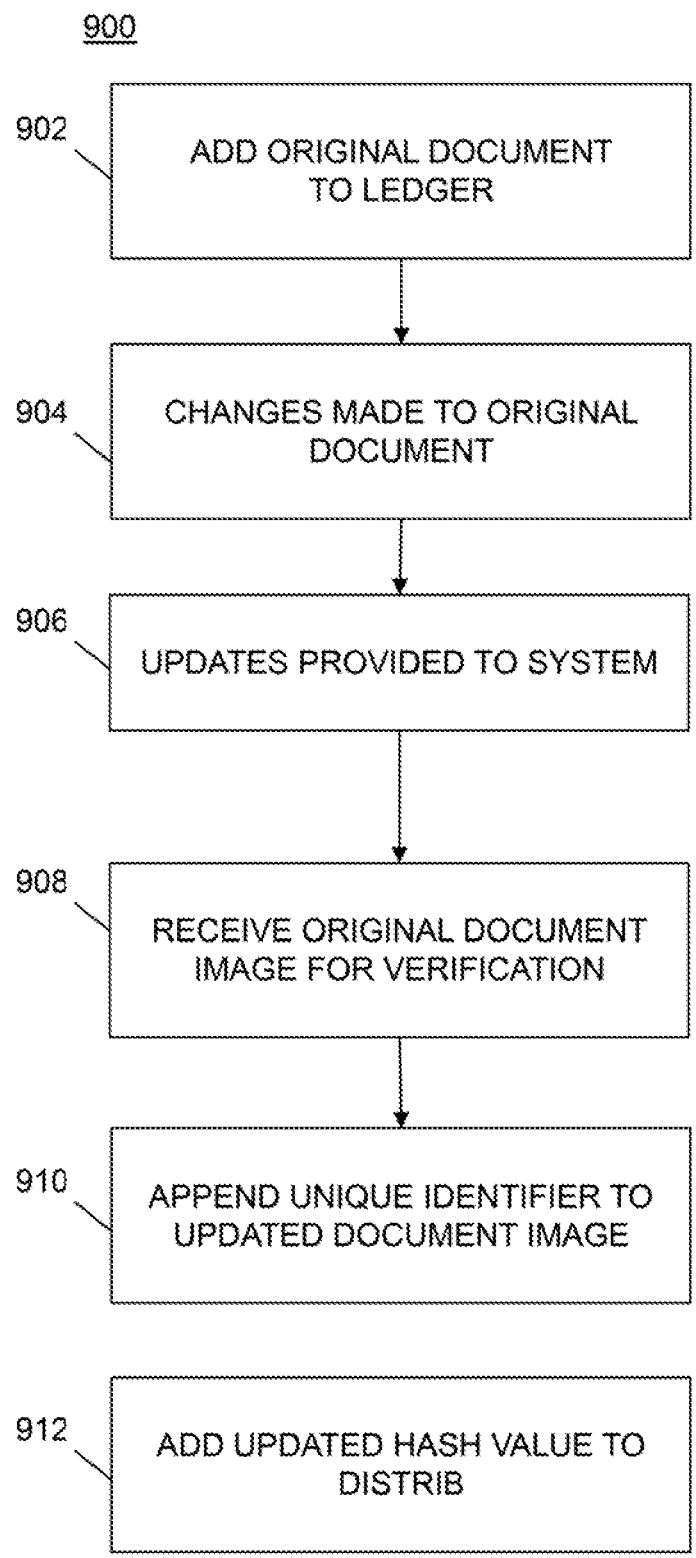
FIG. 8 is a flow chart illustrating one embodiment of a method for tracking changes to the original document, in accordance with some embodiments.

In some embodiments, the distributed ledger is configured to track one or more changes to the original document. FIG. 8 is a flow chart illustrating one embodiment of a method 900 for tracking changes to the original document. At step 902, an original document is added to the distributed ledger according to the method 700 discussed in conjunction with FIG. 6. At step 904, one or more changes to the document are made. The changes to the document can include updates, substitution, and/or cancellation of one or more terms in the original document, indicators that certain conditions in the original document (such as milestones) have/have not been met, updates to responsible parties, ownership, security interest, and/or any other suitable update to the original document.

At step 906, the updates to the document are provided to the system 140. Although embodiments are discussed herein where the updated document is provided to the system 140 for further processing, it will be appreciated that the additional steps of method 900 can be performed by any suitable element of the system 100, such as the client devices 102, 104, 106, the system 140, the peers 160, and/or any combination thereof.

The updates to the original document can be provided as individual transactions and/or as an image of the updated document. For example, in some embodiments, one or more changes are provided to the system 140 as transactions being performed on the tracked document image. The transactions can include a change in ownership (or security interest) that is processed according to transfers of digital assets as discussed above. As another example, in some embodiments, an updated document image is generated including all of the changes to the original document and is added to the distributed ledger, for example, according to the method 700 illustrated in FIG. 5.

In some embodiments, a copy of the original document is provided with the updated document image to provide for verification of the original document. For example, in some embodiments, a copy of the original document is provided to verify the updated document includes only changes made with respect to the original document and/or the last updated version of the document tracked by the distributed ledger. At step 908, the system 140 receives a copy of the original document for authentication. The copy of the original document can be provided with the one or more updates and/or can be provided separately from the one or more updates. In some embodiments, the system 140 authenticates the copy of the original document in accordance with the method 800 discussed in conjunction with FIG. 8.

If the copy of the original document is authenticated, at step 910, the system 140 appends a unique identifier to the updated document. In some embodiments, the unique identifier is the hash value of the original document. In some embodiments, the hash value of the original document is retrieved from the distributed ledger and appended to the updated document image, as discussed above in accordance with step 706 of method 700. In other embodiments, the hash value of the original document can be generated from the copy of the original document provided simultaneously with the updated document image. The hash value of the original document provides authentication and/or tracking of document versions within the distributed ledger. In some embodiments, the hash value appended to the updated document image is the hash value of the most-recent updated document image associated with the original document stored by the distributed ledger.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:

1. An apparatus, comprising:
   a communications unit;
   a storage unit storing instructions; and
   at least one processor coupled to the communications unit and the storage unit, the at least one processor being configured to execute the instructions to:
   access rules data maintained within one or more ledger blocks of a distributed ledger, the rules data being established by a centralized authority;
   generate a first hash value based on an application of a hash function specified within the accessed rules data to first document data that incorporates a document identifier; and
   generate and transmit, via the communications unit, a first signal that includes the first hash value to one or more computing systems, the first signal comprising information that instructs the one or more computing systems to perform operations that record the first hash value within an additional ledger block of the distributed ledger.

2. The apparatus of claim 1, wherein the at least one processor is further configured to:
   receive, via the communications unit, a second signal comprising second document data representing an original document;
   based on the accessed rules data, modify a portion of the second document data to incorporate the document identifier; and
   generate the first document data based on the modified portion of the second document data.

3. The apparatus of claim 2, wherein:
   the accessed rules data comprises the document identifier; and
   the at least one processor is further configured to extract the document identifier from the accessed rules data and to incorporate the extracted document identifier into the portion of the second document data.

4. The apparatus of claim 2, wherein:
   the accessed rules data identifies a process for generating the document identifier; and
   the at least one processor is further configured to generate the document identifier based on an application of the process to portion of the second document data.

5. The apparatus of claim 1, wherein the at least one processor is further configured to decrypt the accessed rules data using a master cryptographic key associated with the centralized authority.

6. The apparatus of claim 1, wherein the hash function includes at least one of a public key or a private key.

7. The apparatus of claim 1, wherein the at least one processor is further configured to:
   receive, via the communications unit, a second signal that includes second document data representative of an unverified document;
   identify and extract the first hash value from the additional block of the distributed ledger;

based on the accessed rules data, modify a portion of the second document data to incorporate the document identifier;

generate a second hash value based on an application of the hash function to the modified second document data;

authenticate the unverified document when the second hash value corresponds to the first hash value; and generate and transmit, via the communications unit, a third signal that includes an authentication message to a device, the authentication message confirming the authentication of the unverified document.

8. The apparatus of claim 1, wherein:
the first document data represents an original document; and
the at least one processor is further configured to:
   receive, via the communications unit, a second signal that includes second document data representative of an updated document, the updated document comprising an update to the original document;
   based on the accessed rules data, modify a portion of the second document data to incorporate an additional document identifier;
   generate a second hash value of the modified second document data in accordance with the accessed rules data; and
   generate and transmit, via the communications unit, a third signal that includes the second hash value to the one or more computer systems, the second signal comprising additional information that instructs the one or more computing systems to perform operations that record the second hash value within another ledger block of the distributed ledger.

9. The apparatus of claim 8, wherein:
the first document data comprises image data associated with an original document; and
the first signal comprises the first hash value and a portion of the image data; and
the information further instructs the one or more computing systems to perform operations that record the first hash value and the portion of the image data within the additional ledger block.

10. The apparatus of claim 9, wherein the at least one processor is further configured to apply one or more image verification processes to the image data prior to generating the first hash value.

11. A computer-implemented method, comprising:
by at least one processor, accessing rules data maintained within one or more ledger blocks of a distributed ledger, the rules data being established by a centralized authority;
generating, by the at least one processor, a first hash value based on an application of a hash function specified within the accessed rules data to first document data that incorporates a document identifier; and
generating and transmitting, by the at least one processor, a first signal that includes the first hash value to one or more computing systems, the first signal comprising information that instructs the one or more computing systems to perform operations that record the first hash value within an additional ledger block of the distributed ledger.

12. The computer-implemented method of claim 11, wherein the hash function includes at least one of a public key or a private key.

13. The computer-implemented method of claim 11, further comprising:

receiving, by the at least one processor, a second signal that includes second document data representative of an unverified document;

by the at least one processor, identifying and extracting the first hash value from the additional block of the distributed ledger;

based on the accessed rules data, modifying, by the at least one processor, a portion of the second document data to incorporate the document identifier;

generating, by the at least one processor, a second hash value based on an application of the hash function to the modified second document data;

authenticating, by the at least one processor, the unverified document when the first hash value corresponds to the second hash value; and generating and transmitting, by the at least one processor, a third signal that includes an authentication message to a device, the authentication message confirming the authentication of the unverified document.

14. An apparatus, comprising:
a communications unit;
a storage unit storing instructions; and
at least one processor coupled to the communications unit and the storage unit, the at least one processor being configured to execute the instructions to:
   access one or more ledger blocks of a distributed ledger, the one or more accessed ledger blocks comprising a first hash value representative of a verified document and rules data established by a centralized authority;
   generate a second hash value based on an application of a hash function specified within the rules data to document data that includes a document identifier;
   authenticate the document data when the first hash value corresponds to the second hash value; and
   generate and transmit, via the communications unit, a first signal that includes an authentication message to a device, the authentication message confirming the authentication of the document data.

15. The apparatus of claim 14, wherein the hash function includes at least one of a public key or a private key.

16. The apparatus of claim 14, wherein the first signal further comprising information that instructs the device to present the authentication message within a digital interface.

17. The apparatus of claim 14, wherein:
the first hash value is representative of first image data associated with the verified document;
the document data comprises second image data associated with an unverified document; and
the at least one processor is further configured to:
   modify a portion of the second image data to incorporate the document identifier; and
   generate the document data based on the modified portion of the second image data.

18. The apparatus of claim 17, wherein:
the rules data comprises the document identifier; and
the at least one processor is further configured to extract the document identifier from the rules data.

19. The apparatus of claim 17, wherein:
the rules data identifies a process for generating the document identifier; and
the at least one processor is further configured to generate the document identifier based on an application of the process to at least the portion of the second image data.

20. The apparatus of claim 14, wherein the at least one processor is further configured to decrypt the rules data using a master cryptographic associated with the centralized authority.

* * * * *